United States Patent [19]

Asanuma et al.

[11] Patent Number: 5,539,397
[45] Date of Patent: Jul. 23, 1996

[54] DRIVING CONTROL SYSTEM FOR VEHICLE

[75] Inventors: Nobuyoshi Asanuma; Hiroshi Sekine; Yoshikazu Tsuchiya; Kazuya Tamura; Hiroyuki Kamiya, all of Wako, Japan

[73] Assignee: Honda Giken Kogyo Kabushiki Kaisha, Tokyo, Japan

[21] Appl. No.: 213,682

[22] Filed: Mar. 16, 1994

[30] Foreign Application Priority Data

Mar. 26, 1993 [JP] Japan ................................ 5-068170
Nov. 2, 1993 [JP] Japan ................................ 5-274254

[51] Int. Cl.$^6$ ................................................ G08G 1/00
[52] U.S. Cl. ................. 340/901; 340/995; 340/437; 340/466; 364/426.04; 364/424.01
[58] Field of Search ........................ 340/995, 437, 340/466; 364/426.04, 443, 424.01

[56] References Cited

U.S. PATENT DOCUMENTS

| 4,882,689 | 11/1989 | Aoki | 340/995 |
| 5,146,219 | 9/1992 | Zechnall | 340/995 |
| 5,270,708 | 12/1993 | Kamishima | 340/995 |
| 5,280,632 | 1/1994 | Jung-Gon | 455/70 |
| 5,315,295 | 5/1994 | Fujii | 340/995 |
| 5,420,580 | 5/1995 | Rawls | 340/936 |

FOREIGN PATENT DOCUMENTS

| 0543543 | 5/1993 | European Pat. Off. |
| 4201142 | 8/1992 | Germany |
| 4205979 | 9/1993 | Germany |
| 9317406 | 9/1993 | Germany |

*Primary Examiner*—John K. Peng
*Assistant Examiner*—Daryl C. Pope
*Attorney, Agent, or Firm*—Weiner, Carrier & Burt; Joseph P. Carrier; Irving M. Weiner

[57] ABSTRACT

A driving control system for a vehicle includes a map information output device for outputting a map, a vehicle position detecting device for detecting a vehicle position of a subject vehicle on the map, a vehicle speed detecting device for detecting a vehicle speed, a passable area determining device for determining a passable area on the map on the basis of the detected vehicle speed, and a passability/impassability judging device for deciding that the vehicle may pass through a portion of road when a road which is in front of the vehicle position in a traveling direction is included in the passable area on the map. The road which is in front of the vehicle position in the traveling direction is compared with the determined passable area, and when the road is included in the passable area, it is decided that the vehicle may pass through the portion of road. Thus, it is possible to properly judge whether or not the vehicle may pass through the portion of road by a simple calculation not including a complex and poor-accuracy calculation of the radius of curvature of a road.

20 Claims, 19 Drawing Sheets

When vehicle speed is low

When vehicle speed is high

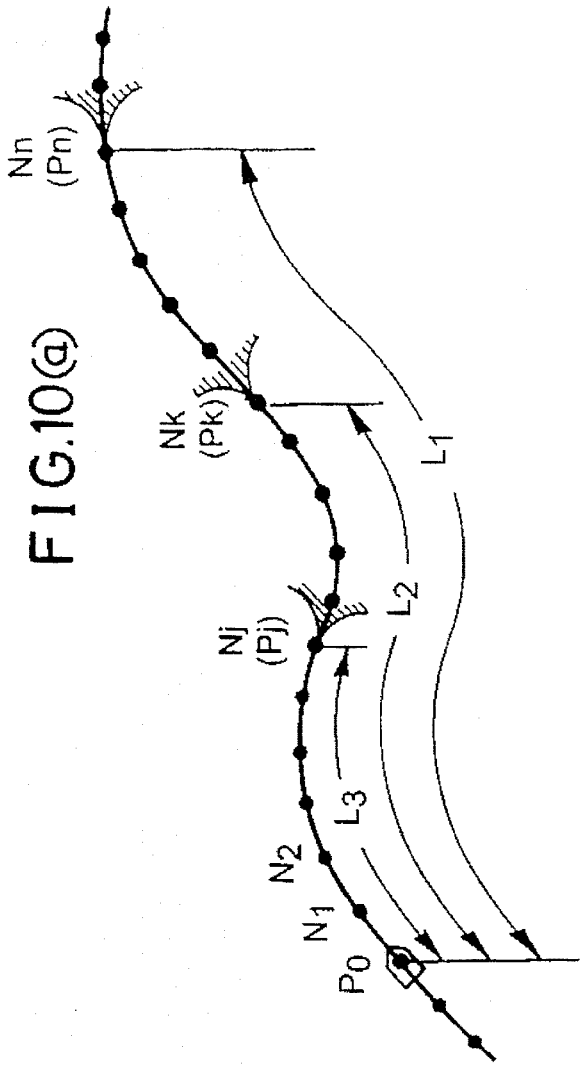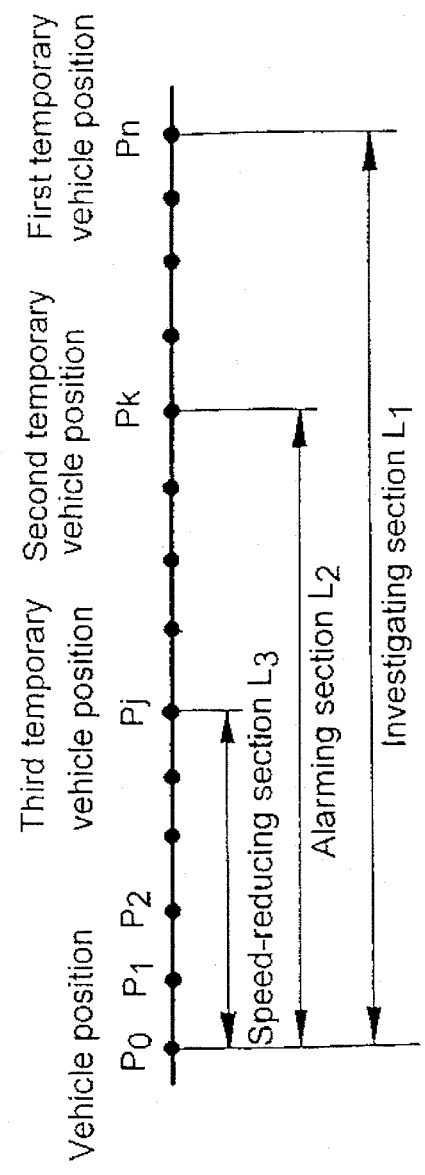

DRIVING CONTROL SYSTEM FOR VEHICLE

BACKGROUND OF THE INVENTION

1. Field of the Invention

The present invention relates to a driving control system for a vehicle, which enables a vehicle to pass through a corner or the like on a road at an appropriate vehicle speed by utilizing a so-called navigation system including a map information output means for outputting a map, and a vehicle position detecting means for detecting a vehicle position on the map.

2. Description of Relevant Art

There is a conventionally known driving information display apparatus utilizing a navigation system, as described, for example, in Japanese Patent Application Laid-open No. 89298/85.

Such driving information display apparatus is capable of not only displaying a map and a vehicle position on a display surface, but also detecting a corner through which the vehicle cannot pass at a current vehicle speed over a given section in a traveling direction of the vehicle on the basis of the travel distance and the radius of curvature of the corner on a road on the map; calculating an appropriate vehicle speed at which the vehicle can properly pass through such corner, and displaying such information to attract a driver's attention.

In the above known technique, the accuracy of the appropriate vehicle speed is largely dependent upon the accuracy of calculation of the radius of curvature of a corner on a road, i.e., the accuracy of the map provided by the navigation system. However, the accuracy of the map provided by the known navigation system is insufficient for correctly calculating the radius of curvature of the corner. Moreover, the above known technique suffers from a problem that the calculation of the radius of curvature of the corner is complicated and, hence, a calculating device of a large capacity is required.

SUMMARY OF THE INVENTION

It is an object of the present invention to provide a control system which enables the travel of a vehicle to be properly controlled by accurately judging whether or not it is possible for the vehicle to pass through a corner on a road without calculation of the radius of curvature of the corner, and accurately determining a vehicle speed at which the vehicle can safely pass through the corner.

To achieve the above object, according to a first aspect and feature of the present invention, there is provided a driving control system for a vehicle, comprising a map information output means for outputting a map, a vehicle position detecting means for detecting a vehicle position of a subject vehicle on the map, a vehicle speed detecting means for detecting a vehicle speed, a passable area determining means for determining a passable area on the map which is safely passable by the vehicle based on the detected vehicle speed, a passability/impassability judging means for deciding that the vehicle is safely passable through a portion or corner of a road which is in front of the vehicle position in a traveling direction of the vehicle when a road is included in the passable area on a map, and all of the discussed components being operatively interconnected.

With the above-described system, the passable area on the map is determined on the basis of the vehicle speed; and the road section which is in front of the vehicle position is compared with the passable area, and when the road is included in the passable area, it is decided that the vehicle is passable through the road section. Therefore, it is possible to properly judge whether or not the vehicle is passable through the road section by a simple calculation without a complicated and poor-accuracy calculation of the radius of curvature of a road.

In addition, according to a second aspect and feature of the present invention, there is provided a driving control system for a vehicle, comprising a map information output means for outputting a map, a vehicle position detecting means for detecting a vehicle position of a subject vehicle on the map, a maximum turnable radius determining means for determining, on the basis of a road portion which is in front of the vehicle position in a traveling direction on the map, a maximum turnable radius required for the vehicle to safely pass through the road portion, a passable vehicle speed calculating means for calculating a passable vehicle speed based on the maximum turnable radius, and all of the discussed components being operatively interconnected.

With the above-described system, the maximum turnable radius required for the vehicle to pass through the road section which is in front of the vehicle position in the traveling direction on the map is determined, and the passable vehicle speed is calculated on the basis of the maximum turnable radius. Therefore, it is possible to determine a passable vehicle speed by a simple calculation without calculation of the radius of curvature of a complex road.

Further, according to a third aspect and feature of the present invention, there is provided a driving control system for a vehicle, comprising a map information output means for outputting a map, a vehicle position detecting means for detecting a vehicle position of a subject vehicle on the map, a vehicle speed detecting means for detecting a vehicle speed, a judging-section determining means for establishing a first section having a predetermined range and a second section having a range narrower than said predetermined range on a road in front of the vehicle position in a traveling direction, a judgment-execution determining means for judging whether or not the vehicle is safely passable through a road in the first section on the basis of the detected vehicle speed and a curved condition of the road on the map, and for determining, on the basis of such judgment, whether or not the judgment of the passability or impassability of the vehicle through a road in the second section should be conducted, a passability/impassability judging means for judging whether or not the vehicle is safely passable through the road in the second section based on the detected vehicle speed and the curved condition of the road on the map, when it is decided by the judgment-execution determining means that the judgment of the passability or impassability of the vehicle through the road in the second section should be conducted, providing at least one of a means for an alarm and a vehicle speed adjustment based on the judgment of whether or not the vehicle is passable through the road in the second section, and all of the discussed components being operatively interconnected.

With the above-described system, for example, when the vehicle is traveling on a road having a long straight portion which provides no hindrance to the vehicle's passage thereover, as does a freeway, it is not necessary to conduct the judgment of whether or not the vehicle is passable through the road in the second section and, hence, it is possible to reduce the calculation quantity which must be made by the system. This makes it possible to provide a reduction in size of the calculating device and, in its turn, of the entire control unit and to improve the speed of another or subsequent calculation by the system.

The above and other objects, features and advantages will become apparent from the following description of preferred embodiments, taken in conjunction with the accompanying drawings.

BRIEF DESCRIPTION OF THE DRAWINGS

FIGS. 1 and 8 illustrate a driving control system for a vehicle according to a first embodiment of the present invention, wherein FIG. 1 is a block diagram illustrating the entire arrangement;

FIG. 8 is a diagram for explaining a method for determining a passable vehicle speed.

FIGS. 9 to 20 illustrate a driving control system for a vehicle according to a second embodiment of the present invention, wherein FIG. 9 is a block diagram illustrating the entire arrangement;

FIG. 10(a), 10(b) are jointly a diagram for explaining the outline of the operation;

FIGS. 11 to 13 are a flow than illustrating the operation;

FIG. 14 is a diagram for explaining a method for determining a detection area;

FIG. 15 is a diagram for explaining another method for determining a detection area;

FIG. 16 is a diagram for explaining a method for calculating a target vehicle speed;

FIG. 17 is a schematic view of an instrument panel;

FIG. 18 is a diagram illustrating one embodiment of an alarm means;

FIG. 19 is a diagram illustrating another embodiment of an alarm means; and

FIG. 20 is a diagram illustrating a further embodiment of an alarm means.

DESCRIPTION OF THE PREFERRED EMBODIMENTS

A driving control system for a vehicle according to a first embodiment of the present invention will now be described in connection with FIGS. 1 to 8.

Figure 1:
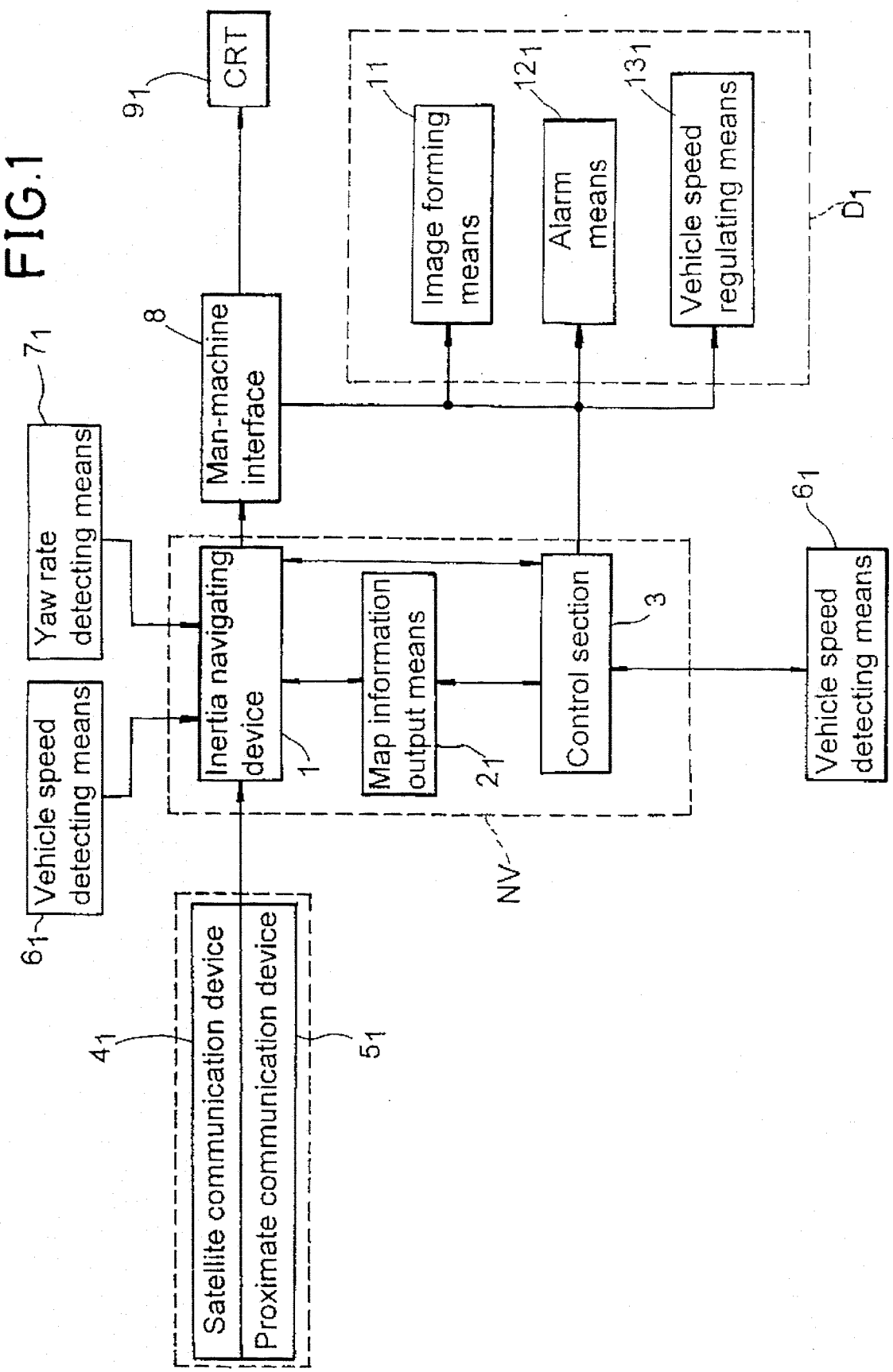

Referring to FIG. 1, reference character NV is a navigation system for an automobile, which includes therein a well-known inertia navigating device 1, a map information output means $2_1$ using an IC card or CD-ROM, and a control section 3 for various calculations which will be described hereinafter. The inertia navigating device 1 receives signals from a vehicle speed detecting means $6_1$ and a yaw rate detecting means $7_1$ in addition to a vehicle position information, a road information, a traffic information and the like from a satellite communication device $4_1$ or a proximity communication device $5_1$. Then the navigation device 1 calculates a current position of a subject vehicle, or a path to a goal, on the basis of the signals and road data from the map information output means $2_1$, and displays them on CRT $9_1$ through a man-machine interface 8. The control section 3 performs various calculations, which will be described hereinafter, in real time on the basis of outputs from the map information output means $2_1$ and the vehicle speed detecting means $6_1$.

Reference character $D_1$ is a vehicle speed control unit which includes therein an image forming means 11, an alarm means $12_1$ and a vehicle speed regulating means $13_1$. The image forming means 11 includes, for example, a head-up display, and displays a road map, a vehicle position, a corner-passable vehicle speed or the like. The alarm means $12_1$ includes an acoustical means such as a buzzer or chime and gives an alarm to a driver to reduce the travel speed. The vehicle speed regulating means $13_1$ includes a brake device or an automatic cruise device and regulates the vehicle speed, so that the vehicle can pass through a corner.

Figure 2:
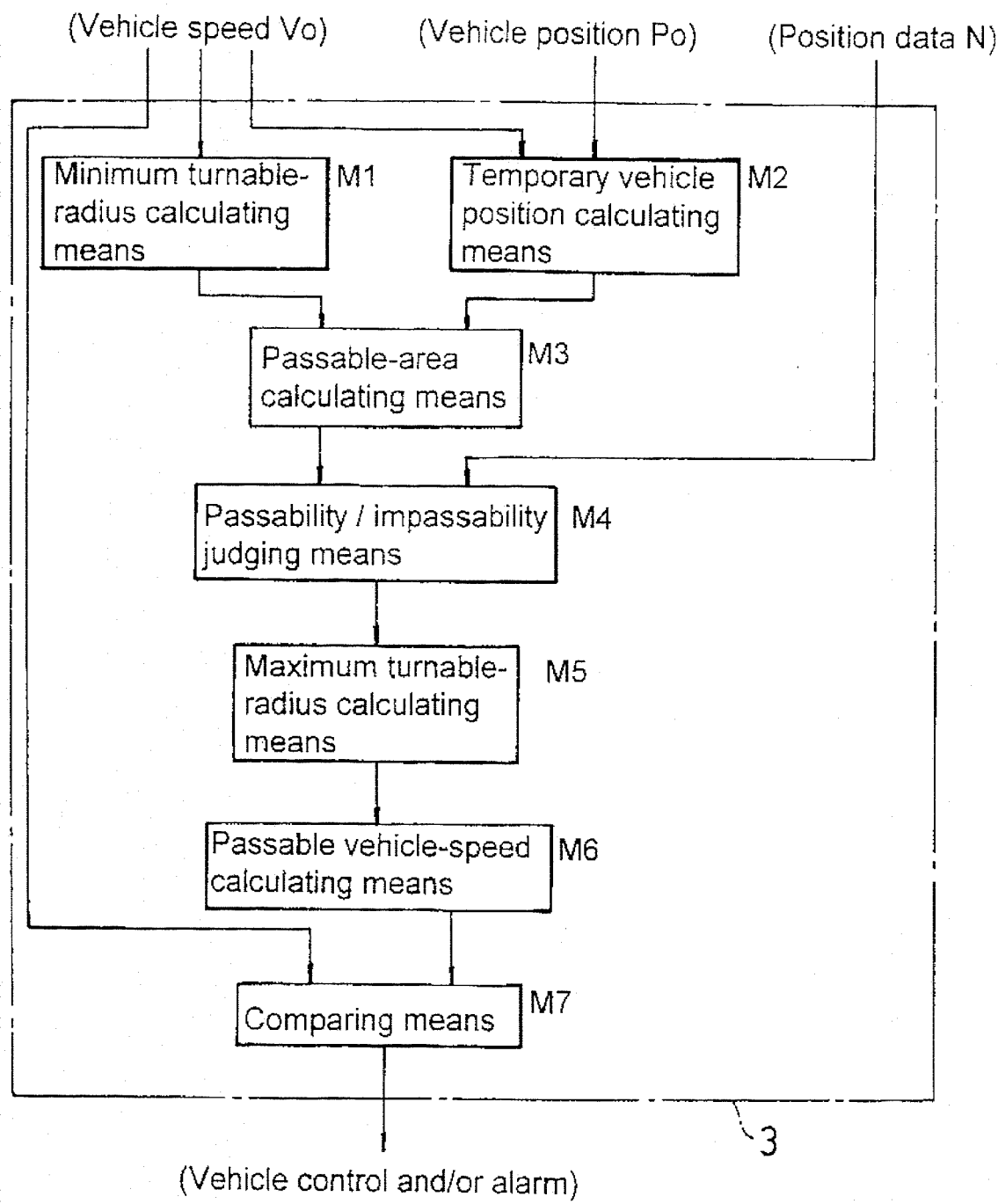
FIG. 2 is a block diagram of a control section.

As shown in FIG. 2, the control section 3 of the navigation system NV includes a minimum turnable radius calculating means M1 for calculating a minimum turnable radius R of a vehicle on the basis of a vehicle speed $V_0$; a temporary or transient vehicle-position calculating means M2 for calculating a temporary or transient vehicle position $P_1$ which is in front of the vehicle position $P_0$ in the traveling direction by using a vehicle speed $V_0$ and the vehicle position $P_0$; a passable area determining means M3 for determining a vehicle-passable area A from the minimum turnable radius R of the vehicle and the temporary vehicle position $P_1$; a passability/impassability judging means M4 for judging whether or not the vehicle is passable through a corner, from road position data N and the vehicle-passable area A; a maximum turning-radius calculating means M5 for calculating a maximum turning-radius R' such that the position data N is included in the passable area A if the vehicle can not pass the corner; a passable vehicle-speed calculating means M6 for calculating a passable vehicle-speed $V_{MAX}$ on the basis of the maximum turning-radius R'; and a comparing means M7 for comparing the passable vehicle-speed $V_{MAX}$ with the vehicle speed $V_0$. The vehicle speed control unit $D_1$ is controlled on the basis of an output from the comparing means M7.

The operation of the driving control system according to the present invention having the above-described construction will be described below with reference to a flow chart in FIG. 3.

Figure 4:
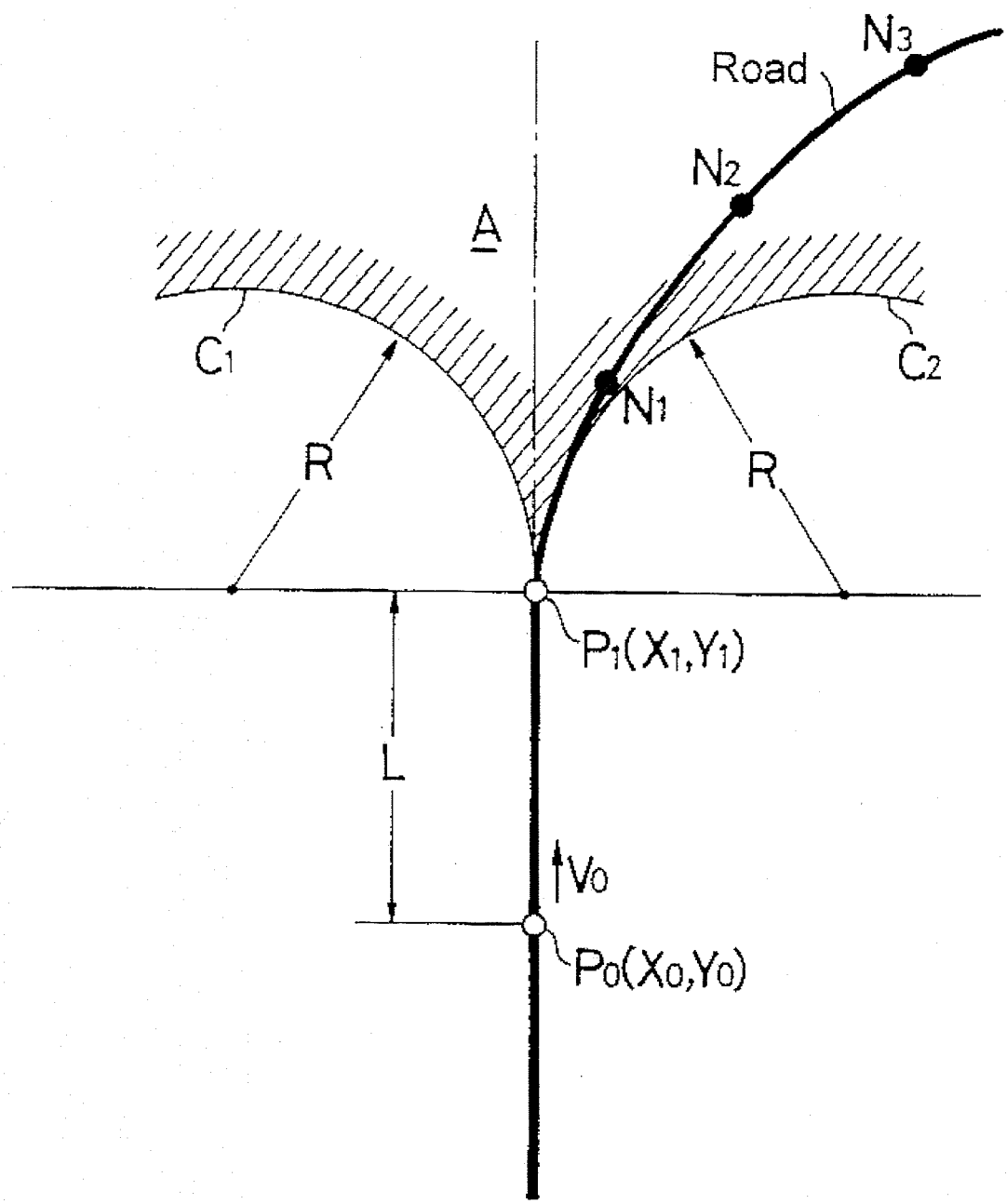
FIG. 4 is a diagram for explaining the operation at a low vehicle speed.
Figure 5:
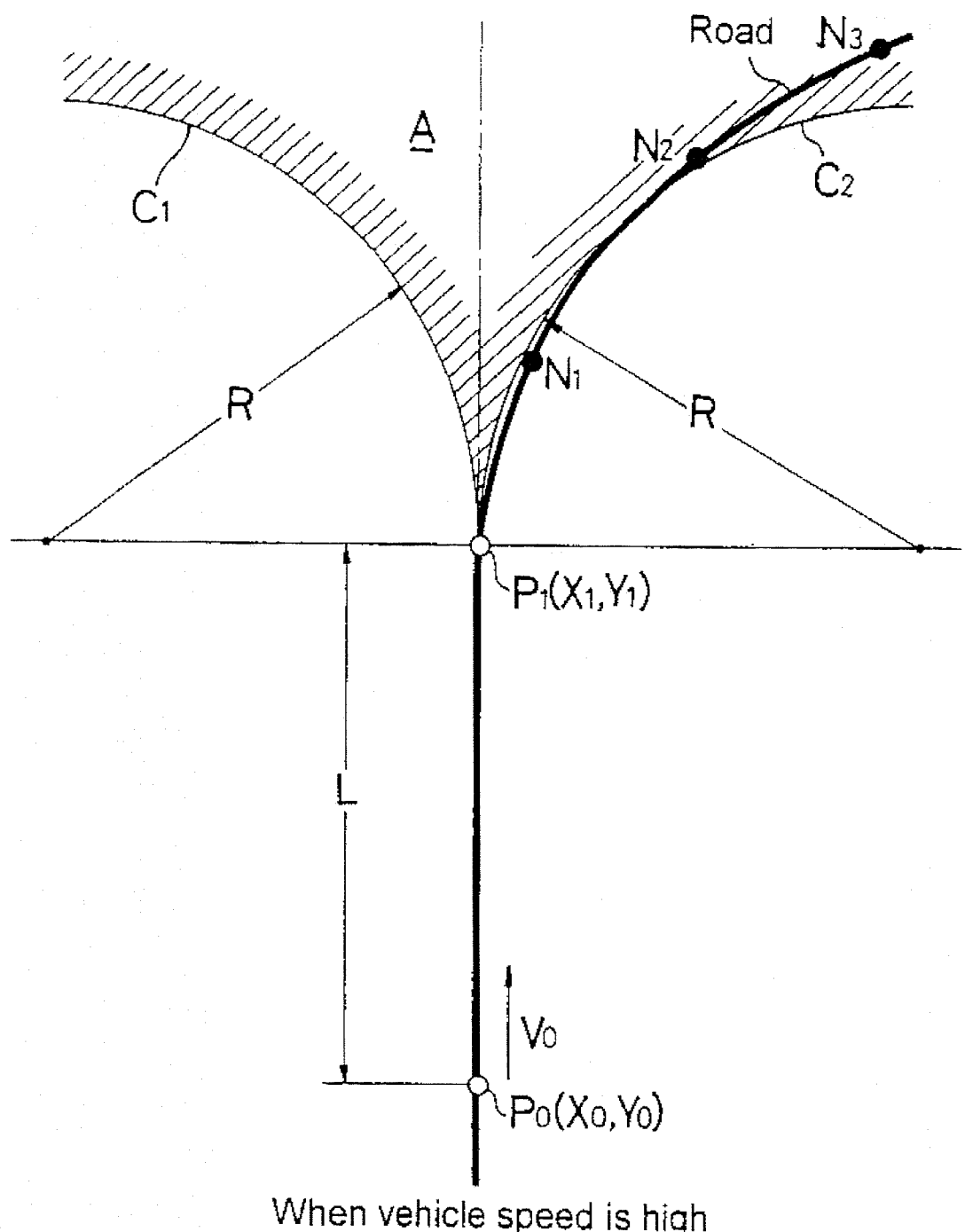
FIG. 5 is a diagram for explaining the operation at a high vehicle speed.

First, a current position $P_0$ ($X_0$, $Y_0$) of the subject vehicle is detected by the inertia navigating device 1 of the navigation system NV (at a step S1), and a current vehicle speed $V_0$ is detected by the vehicle speed detecting means $6_1$ (at a step S2). Then, a preread distance L is calculated on the basis of the vehicle speed $V_0$ (at a step S3), and the temporary vehicle position calculating means M2 calculates a temporary vehicle position $P_1$ ($X_1$, $Y_1$) from the vehicle position $P_0$ ($X_0$, $Y_0$) and the preread distance L (at a step S4). As shown in FIGS. 4 and 5, the temporary vehicle position $P_1$ ($X_1$, $Y_1$) is a reference position in which it is judged whether or not the vehicle is passable through the corner, and the passable vehicle speed $V_{MAX}$ enabling the vehicle to pass through the corner is determined. The preread distance L is determined at a larger value, as the vehicle speed $V_0$ is larger, so that a sufficient speed-reduction distance can be insured when the current vehicle speed $V_0$ is too large such that the vehicle is impassable through a corner which is in front of the temporary vehicle position $P_1$ ($X_1$, $Y_1$).

Then, the minimum turnable radius calculating means M1 searches, on the map, a minimum turnable radius R on the basis of the vehicle speed $V_0$ (at a step S5). This minimum turnable radius R is larger at a larger vehicle speed $V_0$ and smaller at a smaller vehicle speed $V_0$.

Subsequently, a passable area A is determined by the passable area determining means M3. More specifically, two same-radius circular arcs $C_1$ and $C_2$ having a radius equal to the minimum turnable radius R are defined so as to contact with each other at the temporary vehicle position $P_1$ ($X_1$, $Y_1$), and the passable area A is established outside the two circular arcs $C_1$ and $C_2$ (at a step S6). The minimum turnable radius R is smaller when the vehicle speed $V_0$ is smaller, as shown in FIG. 4, and hence, the passable area A is wider. On the other hand, the minimum turnable radius R is larger when the vehicle speed $V_0$ is larger, as shown in FIG. 5, and hence, the passable area A is narrower.

Then, the map information output means $2_1$ establishes a plurality of node points N=$N_1$, $N_2$, $N_3$, ... on a road on the basis of the road position data read from the IC card or the CD-ROM, and the passability/impassability judging means M4 judges whether or not these node points are present in the passable area A (at a step S7). When the node points N are present in the passable area A as shown in FIG. 4, it is decided that the vehicle is passable through the corner at the current vehicle speed $V_0$. On the other hand, when the node points N are out of the passable area A as shown in FIG. 5, it is decided that the vehicle is impassable through the corner at the current vehicle speed $V_0$. The node points are established at closer distances spaced apart from one another, as a road has a smaller radius of curvature.

Figure 6:
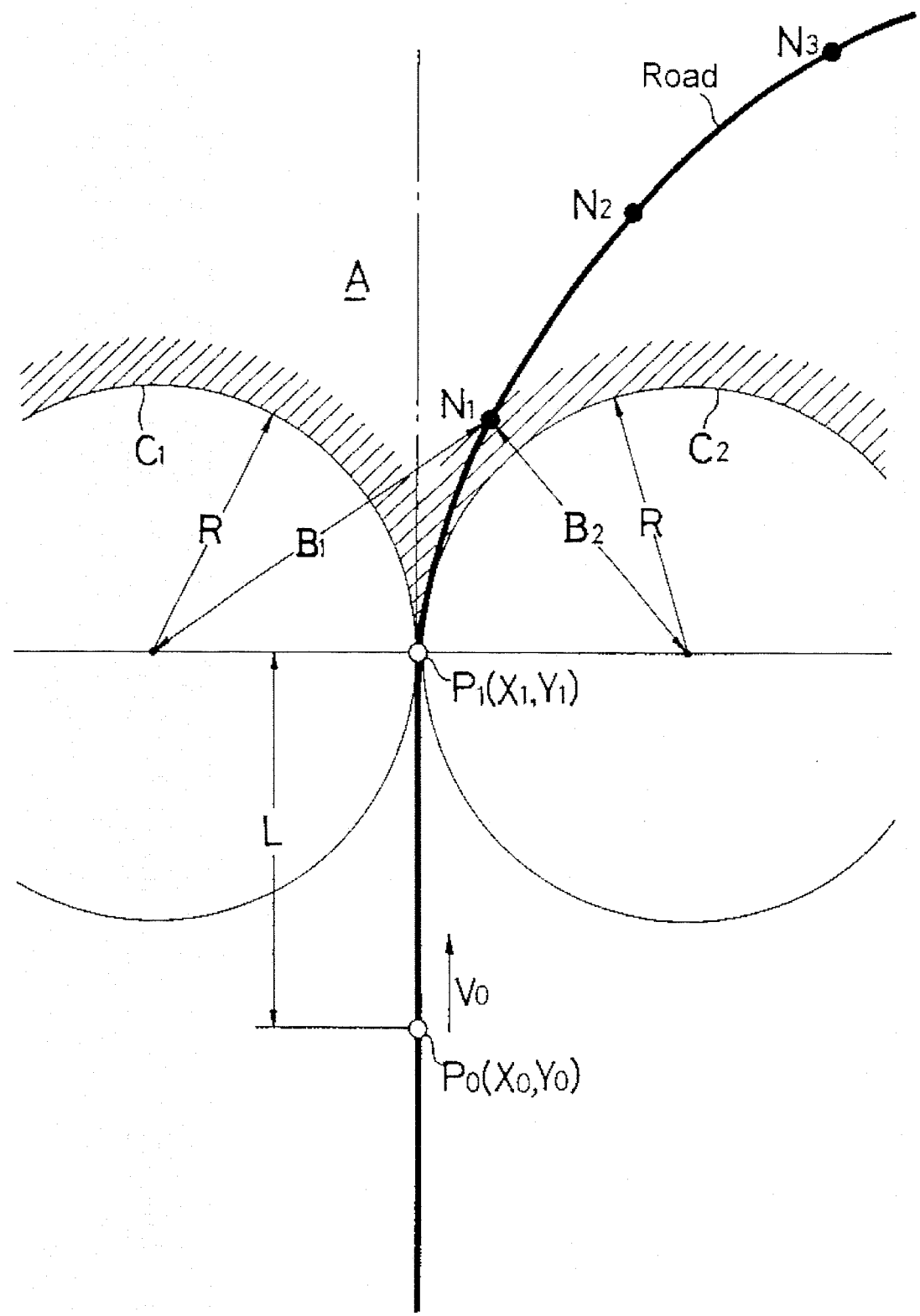
FIG. 6 is a diagram for explaining the operation when a road is within a passable area.
Figure 7:
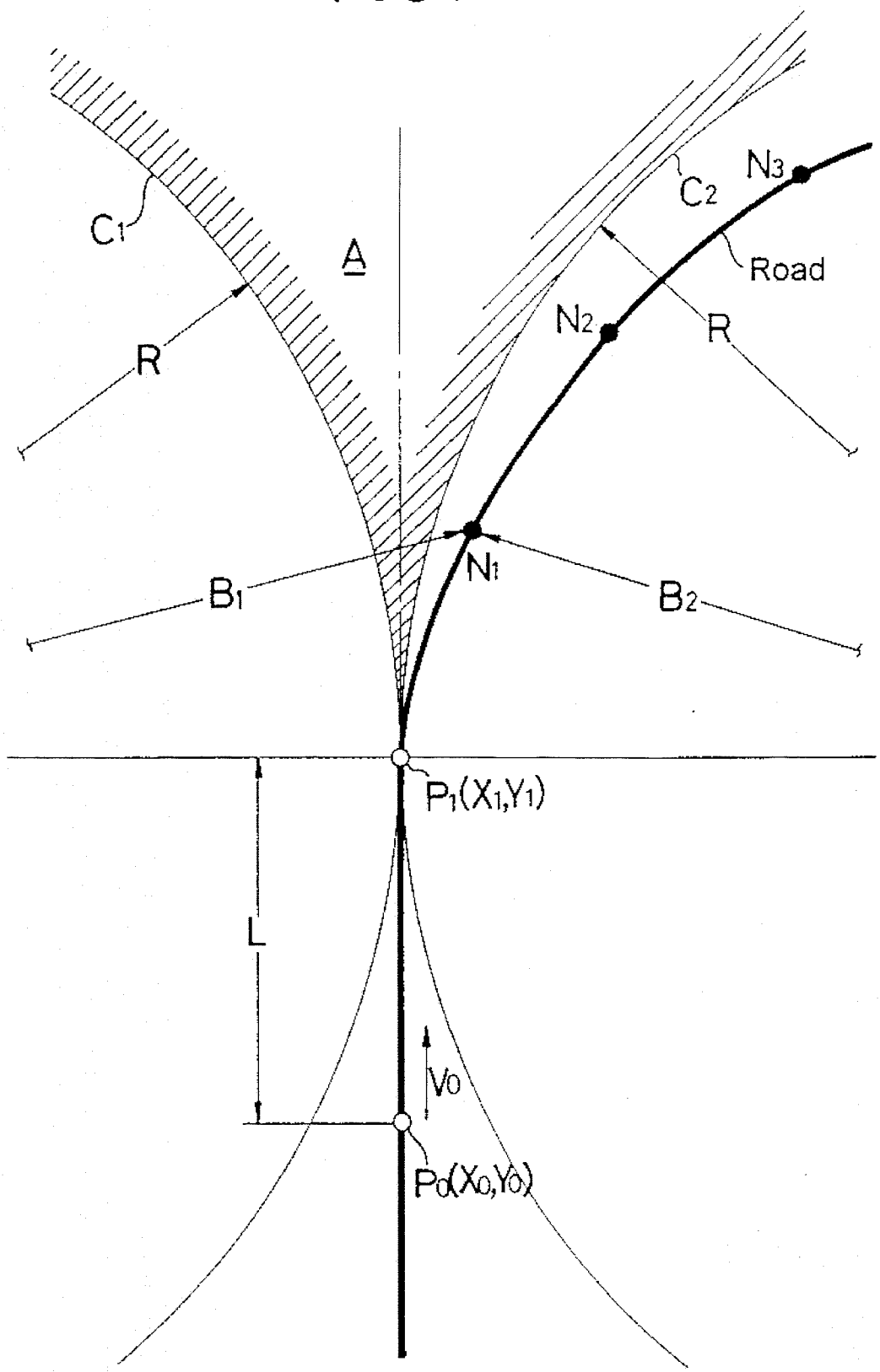
FIG. 7 is a diagram for explaining the operation when a road is out of the passable area.

Whether the node points N are inside or outside the passable area A is judged in the passability/impassability judging means M4 in a following manner: If both of distances $B_1$ and $B_2$ between the centers of the two circular arcs $C_1$ and $C_2$ having the radius R and the node point N are larger than a radius R, as shown in FIG. 6, it is decided that the node point N is inside the passable area A, and the vehicle is passable through the node point N at the current vehicle speed $V_0$. On the other hand, if one of the distances $B_1$ and $B_2$ (e.g., $B_2$) between the centers of the two circular arcs $C_1$ and $C_2$ having the radius R and the node point N is smaller than a radius R, as shown in FIG. 7, it is decided that the node point N is outside the passable area A, and the vehicle is impassable through the node point N at the current vehicle speed $V_0$.

Figure 8:
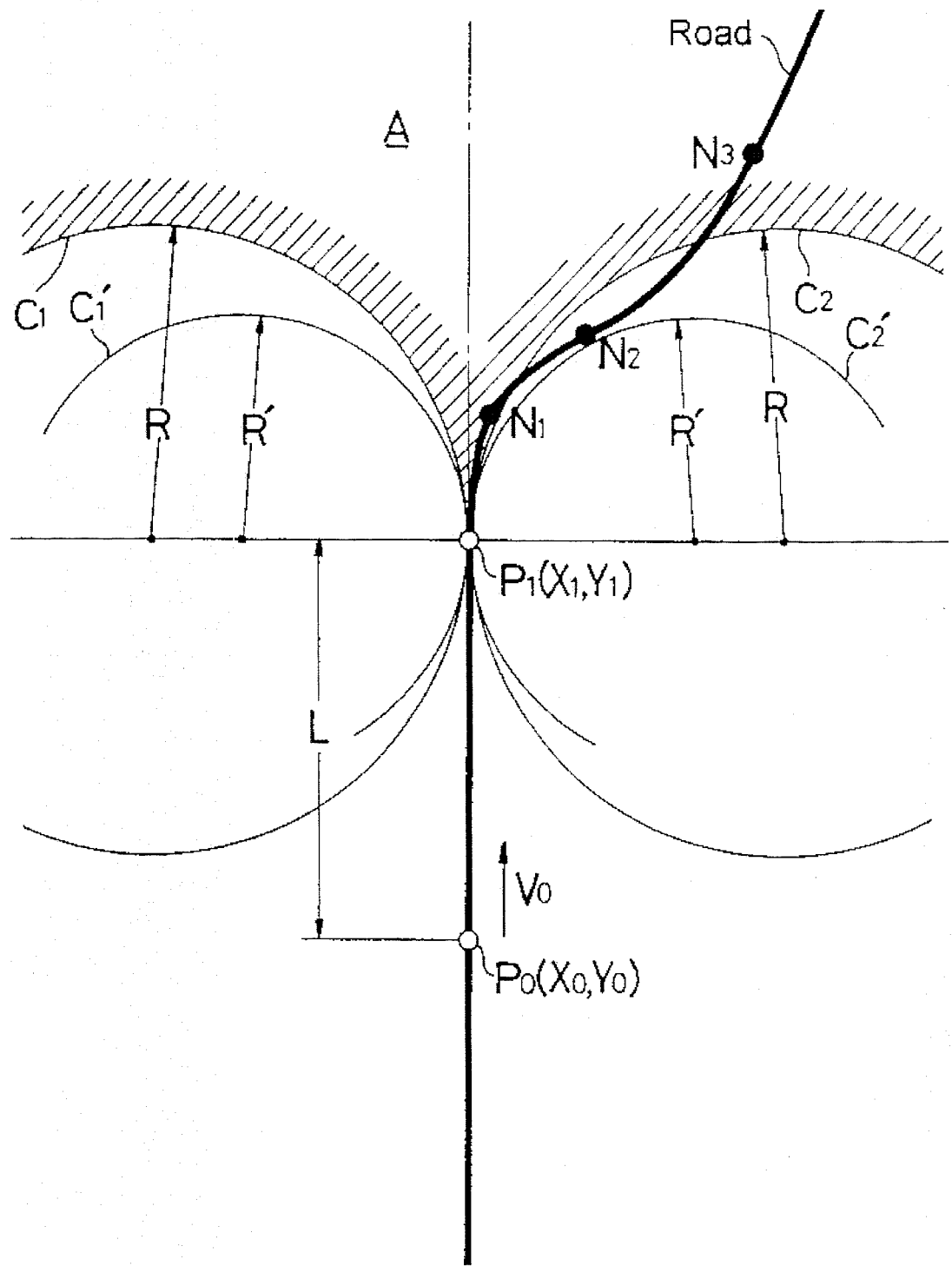

Even if, for example, the node points $N_1$ and $N_3$ are inside the passable area A, if the node point $N_2$ is outside the passable area A, as shown in FIG. 8, the vehicle is impassable through the node point N at the current vehicle speed $V_0$. Therefore, to permit the vehicle to pass through the corner at the current vehicle speed $V_0$, it is required that all the node points N are inside the passable area A.

When it is decided at the step S7 that the vehicle is impassable through the corner, a maximum turning radius R' required for the vehicle to pass the corner is calculated in the maximum turning radius calculating means M5 (at a step S8). The maximum turning radius R' is determined as a radius R' of circular arcs $C_1'$ and $C_2'$ inside which all the node points are not present (see FIG. 8). Therefore, if the vehicle speed is reduced down to a speed at which the vehicle can be turned with the maximum turning radius R', the vehicle can pass through the corner.

A vehicle speed $V_1$ at which the vehicle can be turned with the maximum turning radius R' is calculated in the passable vehicle-speed calculating means M6 (at a step S9), and such vehicle speed $V_1$ is determined as a passable vehicle speed $V_{MAX}$ (at a step S10). When it is decided at the step S7 that the vehicle is passable through corner, the processing is advanced to the step S10, at which the current vehicle speed $V_0$, as it is, is determined as the passable vehicle speed $V_{MAX}$. The current vehicle speed $V_0$ is compared with the passable vehicle speed $V_{MAX}$, i.e., if the vehicle is impassable through the corner, the vehicle speed $V_0$ is adjusted by the vehicle speed regulating means $13_1$ of the vehicle control unit $D_1$, so that it is reduced to a level equal to or less than the passable vehicle speed $V_{MAX}$, until the vehicle reaches the temporary vehicle position $P_1$ (at a step S12). This enables the vehicle to reliably pass through the corner.

It should be noted that in reducing the vehicle speed $V_0$ to a level equal to or less than the passable vehicle speed $V_{MAX}$, the alarm means $12_1$ can be used in combination. More specifically, when the current vehicle speed $V_0$ is, for example, within 1.2 times the passable vehicle speed $V_{MAX}$, the alarm means $12_1$ may be operated to provide only an alarm. When the vehicle speed $V_0$ reaches at least 1.2 times the passable vehicle speed $V_{MAX}$, the vehicle speed regulating means $13_1$ may be operated to reduce the vehicle speed.

Without carrying out the complicated and low-accuracy calculation of a radius of curvature of a corner, it is judged whether or not the vehicle is passable through the corner. When the vehicle is impassable through the corner at the current vehicle speed, the vehicle is enabled to pass through the corner at a proper vehicle speed by performing the reduction of the vehicle speed by the alarm means $12_1$ and/or the vehicle speed regulating means $13_1$.

In the driving control system for the vehicle according to the first embodiment, when the preread distance L and the minimum turnable radius R are determined on the basis of the vehicle speed $V_0$, they can be corrected on the basis of operational conditions such as the weight of a vehicle body and the like and/or driving environments such as a frictional coefficient of a road and the like. For example, when the weight of a vehicle body is large and the frictional coefficient of a road is small, if the preread distance L is set at a large value, and the minimum turnable radius R is set at a large value, a more proper judgment and control can be performed.

Figure 3:
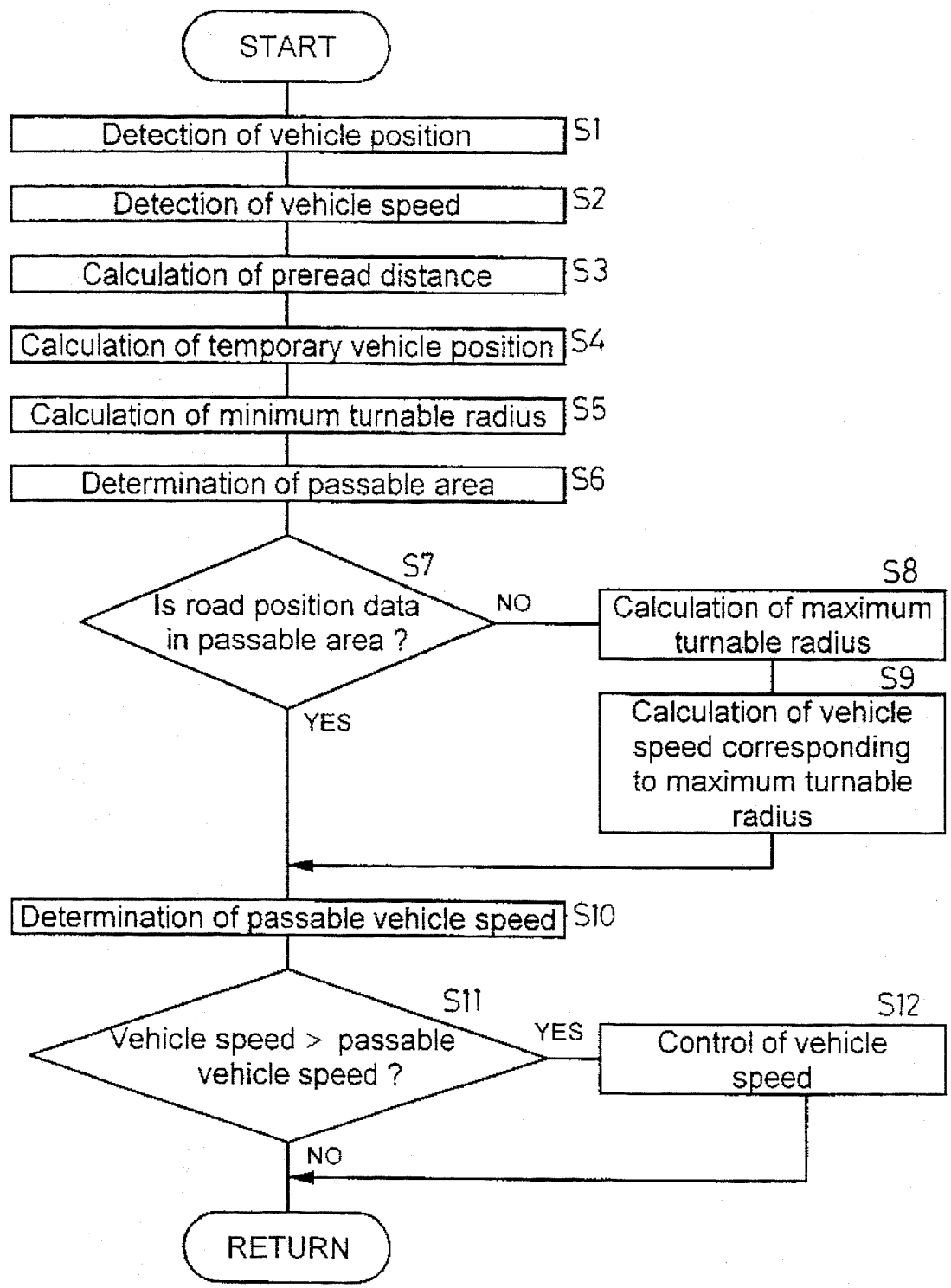
FIG. 3 is a flow sheet illustrating the operation.

If a "NO" determination is made at the step S11 of the flow chart in FIG. 3, i.e., if the vehicle is passable through the corner at the current vehicle speed $V_0$, it is possible to determine that the vehicle can pass through the corner, no matter how many km/hr the speed may be reduced from the current vehicle speed $V_0$.

Further, the passable vehicle speeds $V_{MAX}$ changed momentarily can be stored in a memory while being sequentially renewed over a predetermined time, and the current vehicle speed $V_0$ can be compared with the maximum value of the stored passable vehicle speeds $V_{MAX}$.

A driving control system for a vehicle according to a second embodiment of the present invention will now be described in connection with FIGS. 9 to 16.

Figure 9:
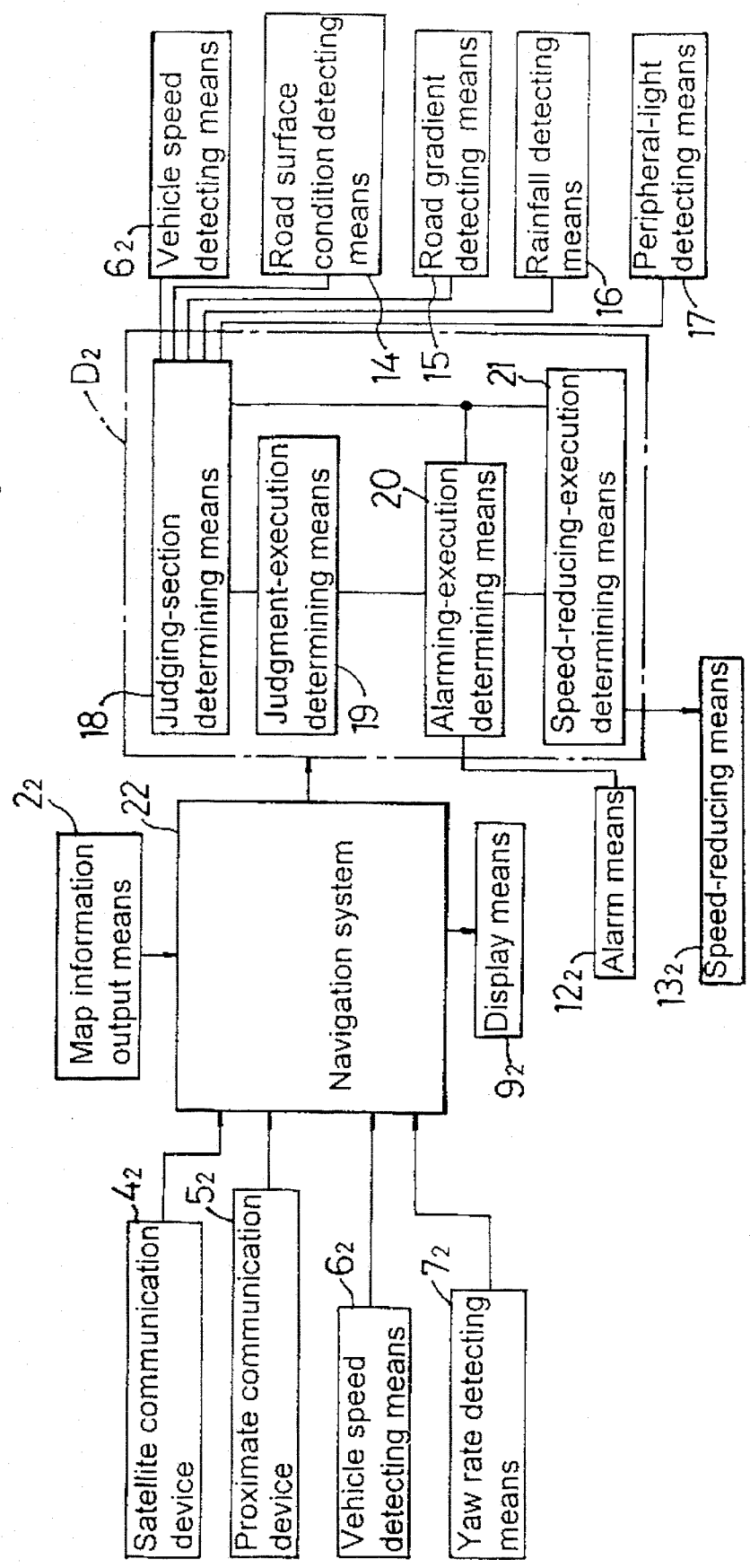

In FIG. 9, reference character 22 is a navigation system for an automobile. A map information output device $2_2$ using an IC card or CD-ROM is connected to the navigation system 22. Various information from a satellite communication device $4_2$ and a proximity communication device $5_2$ and signals from a vehicle speed detecting means $6_2$ and a yaw rate detecting means $7_2$ are supplied to the navigation system 22. A display means $9_2$ including CRT is connected to the navigation system 22. A path to a goal and a vehicle position on a map are displayed on the display means $9_2$.

Map data and information such as the vehicle position are supplied from the navigation system 22 to a vehicle speed control unit $D_2$. The vehicle position is detected by a vehicle position detecting means such as an inertia navigating device. Signals are supplied to the vehicle speed control unit $D_2$ from the vehicle speed detecting means $6_2$, a road surface condition detecting means 14 for detecting a frictional coefficient of a road, a road gradient detecting means 15 for detecting an inclination (up- and down-grades and the degrees thereof) of a road, a rainfall detecting means 16 used in an automatic wiper device or the like, and a peripheral-light detecting means 17 used in an auto-light device or the like.

Further, an alarm means $12_2$ and a speed-reducing means $13_2$ as a vehicle speed regulating means are connected to the vehicle speed control unit $D_2$. In addition to a means for giving an acoustic alarm using a chime or a buzzer, the alarm means $12_2$ may be a means for giving a visual alarm using a light emitting diode or the like which will be described hereinafter. The speed-reduction means $13_2$ is comprised of a throttle actuator connected to an engine control ECU for adjusting the throttle opening degree, and a brake actuator connected to a brake control ECU for actuating a brake device.

The vehicle speed control unit $D_2$ includes a judging-section determining means 18 for determining an investigating section $L_1$, an alarming section $L_2$ and a speed-reducing; section $L_3$; a judgment-execution determining means 19 for determining whether or not a judgment of passability/impassability in the alarm section $L_2$ and the speed-reduction section $L_3$ should be carried out on the basis of the decision that it is possible; or impossible for the vehicle to pass through a road in the investigating section $L_1$; an alarming-execution determining means 20 for operating the alarm means $12_2$ on the basis of the decision that it is possible or impossible for the vehicle to pass the road in the alarming section $L_2$; and a speed-reducing-execution determining means 21 for actuating the speed-reducing means $13_2$ on the basis of the decision that it is possible or impossible for the vehicle to pass through the road in the speed-reducing section $L_3$. The vehicle speed control unit $D_2$ calculates each of signals from the navigation system 22, the vehicle speed detecting means $6_2$, the road surface condition detecting means 14, the rainfall detecting means 16 and the peripheral-light detecting means 17; operates the alarm means $12_2$ to give an alarm to a driver, and actuates the speed-reduction means $13_2$ to automatically reduce the speed of the vehicle.

The outline of the vehicle speed alarm and the vehicle speed control will be described below in connection with FIGS. 10(a), 10(b).

Coordinates N of a plurality of node points on a road which indicate a travel path for the subject vehicle, and coordinates $P_0$ of a current position of the vehicle are included in map data supplied from the navigation system 22 to the vehicle speed control unit $D_2$. An investigating section $L_1$, an alarming section $L_2$ and a speed-reducing section $L_3$ each having a predetermined length determined in accordance with the vehicle speed are established on a road forward in a traveling direction on the basis of a vehicle position $P_0$. A node point lying at a front end of the investigating section $L_1$ farthest from the subject vehicle is determined as a first temporary vehicle position Pn; a node point lying at a front end of the intermediate alarming section $L_2$ is determined as a second temporary vehicle position Pk, and a node point lying at a front end of the speed-reducing section $L_3$ nearest to the subject vehicle is determined as a third temporary vehicle position Pj. The investigating section $L_1$ constitutes a first section in this embodiment, and the alarming section $L_2$ and the speed-reducing section $L_3$ together constitute a second section in this embodiment.

If a road within the investigating section $L_1$ (i.e., between the current position $P_0$ and the first temporary vehicle position Pn) is a straight road, it is decided that there is no hindrance or problem for the passage of the vehicle through the investigating section $L_1$, and the subsequent controls are not conducted. If there is a corner, an intersection, a crank, a junction or the like within the investigating section $L_1$, then it is judged whether or not the vehicle is passable through a road in the alarming section $L_2$ (i.e., between the current point $P_0$ and the second temporary vehicle position Pk) at a current vehicle speed. If it is decided that there is a hindrance, the alarm means $12_2$ is actuated to suggest the driver to conduct the reduction of speed, and it is judged whether or not the vehicle is passable through the speed-reducing section $L_3$ (i.e., between the current position $P_0$ and the third temporary vehicle position Pj) at the current vehicle speed. If it is decided that there is a hindrance to the passage, the speed-reduction means $13_2$ is actuated to automatically reduce the speed of the vehicle.

The above-described operation will be further described below in detail with reference to a flow chart shown in FIGS. 11 to 13.

Figure 11:
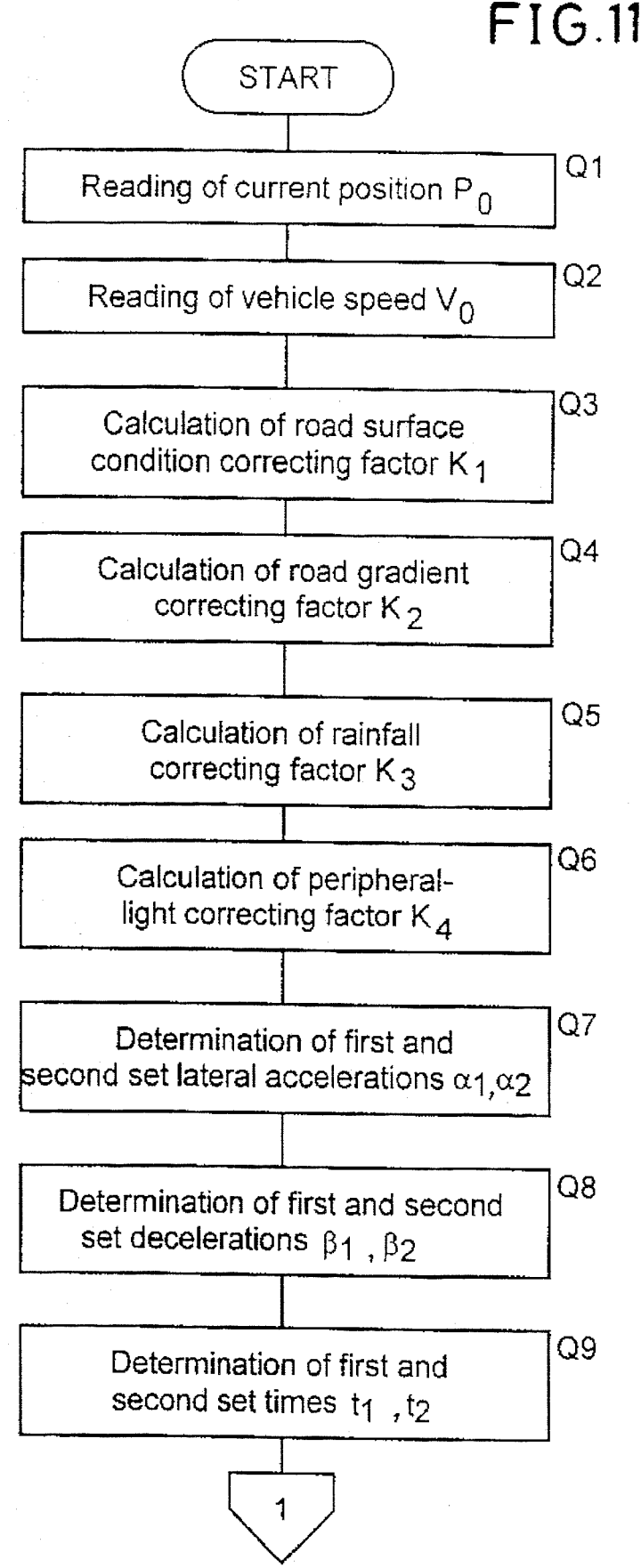

First, in the flow chart portion shown in FIG. 11, coordinates $P_0$ of current position on a map are read into the judging-section determining means 18 from the navigation system 22, and a current vehicle speed $V_0$ is read into the judging-section determining means 18 from the vehicle speed detecting means $6_2$ (at steps Q1 and Q2). In the judging-section determining means 18, a road surface condition correcting factor $K_1$ is calculated on the basis of a road surface frictional coefficient detected by the road surface condition detecting means 14; a road gradient correcting factor $K_2$ is calculated from a road gradient detected by the road gradient detecting means 15; a rainfall correcting factor $K_3$ is calculated from a rainfall condition detected by the rainfall detecting means 16; and a peripheral-light correcting factor $K_4$ is calculated from a brightness detected by the peripheral-light detecting means 17 (steps Q3 to Q6). These correcting factors $K_1$ to $K_4$ are determined, for example, by a map-searching.

Then, a first set lateral acceleration $a_1$ for determining a first detection area $A_1$ for judging whether or not an alarming is required, and a second set lateral acceleration $\alpha_2$ for determining a second detection area $A_2$ for judging whether or not a reduction of speed is required, are determined (at a step Q7). The first and second set lateral accelerations $\alpha_1$ and $\alpha_2$ are intended to define a limit value of lateral acceleration when the vehicle passes through a node point on a road, and they are determined so that $\alpha_2 > \alpha_1$ is established.

When the first and second set lateral accelerations $\alpha_1$ and $\alpha_2$ are determined, their values are corrected on the basis of the road surface condition correcting factor $K_1$, the road gradient correcting factor $K_2$, the rainfall correcting factor $K_3$ and the peripheral-light correcting factor $K_4$. More specifically, when the vehicle is in a condition in which it is difficult for the vehicle to sharply turn such as when the road surface frictional coefficient is small, when the road has a downgrade, when it is raining, or when the environment is dark, the values of the first and second set lateral accelerations $\alpha_1$ and $\alpha_2$ are corrected to small values.

Subsequently, a first set deceleration $\beta_1$ for determining the investigating section $L_1$ and the alarming section $L_2$, and a second set deceleration $\beta_2$ for determining the speed-reducing section $L_3$ are determined (at a step Q8). Each of the first and second set decelerations $\beta_1$ and $\beta_2$ is a deceleration required to sufficiently reduce the speed of the vehicle within a predetermined time, until the vehicle reaches the second temporary vehicle position Pk or the third vehicle position Pj from the current position $P_0$.

When the first and second set decelerations $\beta_1$ and $\beta_2$ are determined, their values are corrected on the basis of the road surface condition correcting factor $K_1$, the road gradient correcting factor $K_2$, the rainfall correcting factor $K_3$ and the peripheral-light correcting factor $K_4$. More specifically, when the vehicle is in a condition in which it is difficult to rapidly reduce the speed of the vehicle, such as when the road surface frictional coefficient is small, when the road has a downgrade, when it is raining, or when the environment is dark, the values of the first and second set decelerations $\beta_1$ and $\beta_2$ are corrected to small values.

In determining the first and second set lateral accelerations $\alpha_1$ and $\alpha_2$ and the first and second set decelerations $\beta_1$ and $\beta_2$, the road surface condition, the road gradient, the rainfall condition and the environment condition are taken into consideration in the present embodiment. But in addition to such factors, a driver condition may also be taken into consideration. More specifically, a driver's fatigued condition or a driver's drowsiness condition can be judged from the monitored movements of driver's eyeballs and eyelids, or from a driver's monitored heart rate, a driver's monitored respiratory rate or the like, and on the basis thereof, the first and second set lateral accelerations $\alpha_1$ and $\alpha_2$ and the first and second set decelerations $\beta_1$ and $\beta_2$ can be corrected to values for safety, respectively.

Then, a first set time $t_1$ which the vehicle requires to reach the second temporary vehicle position Pk from the current position $P_0$, and a second set time $t_2$ which the vehicle requires to reach the third temporary vehicle position Pj from the current position $P_0$ are determined (at a step Q9).

Figure 12:
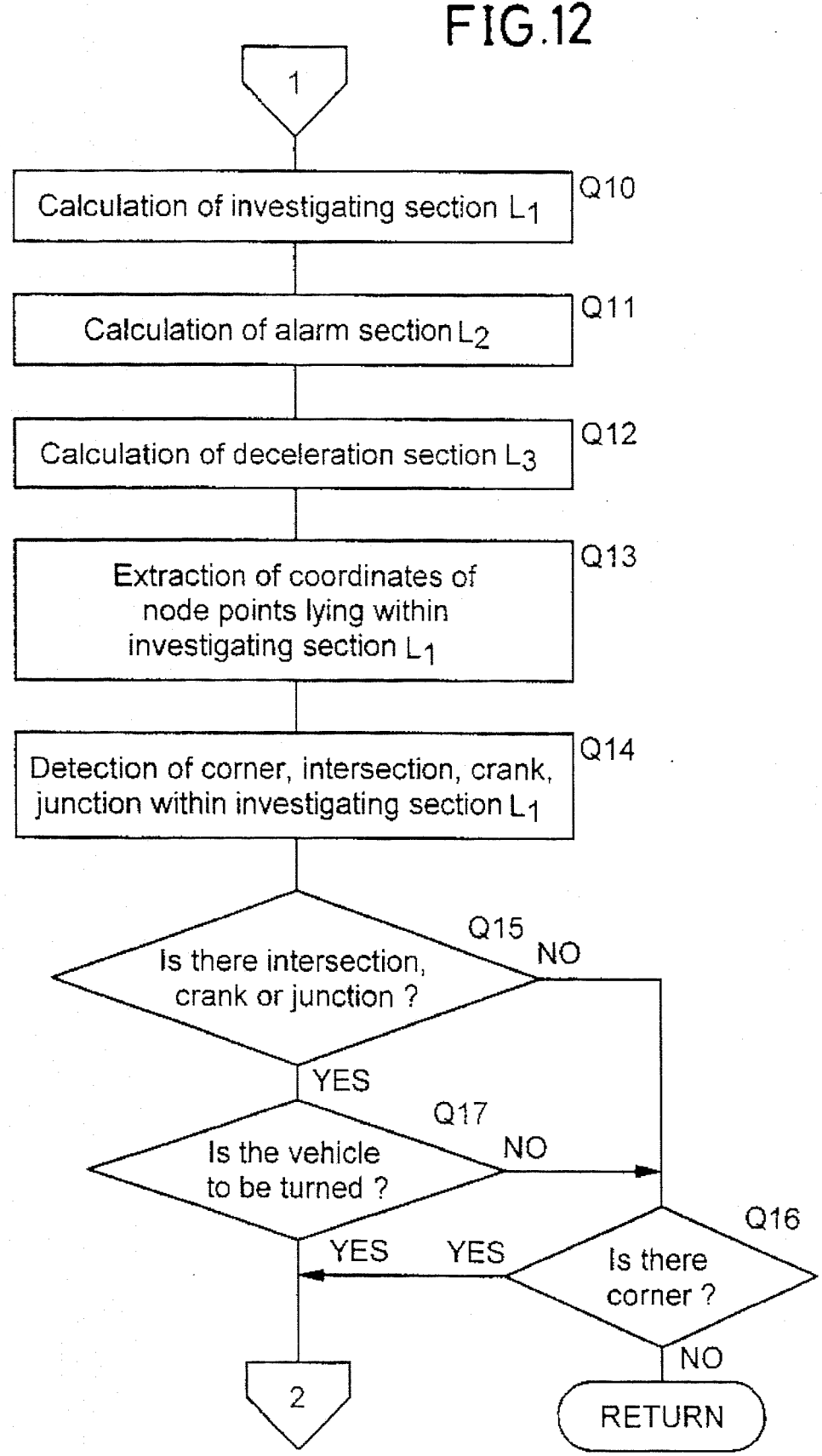

Advancing to the flow chart portion shown in FIG. 12, an investigating section $L_1$ is calculated on the basis of the current vehicle speed $V_0$ and the first set deceleration $\beta_1$ (at a step Q10) according to an expression, $L_1 = V_0^2/(2\beta_1)$. This investigating section $L_1$ corresponds to a distance required to stop the vehicle when the speed-reduction from the vehicle speed $V_0$ is conducted with the first set deceleration $\beta_1$.

An alarming section $L_2$ is calculated on the basis of the current vehicle speed $V_0$, the first set deceleration $\beta_1$ and the first set time $t_1$ according to an expression, $L_2 = V_0 t_1 - (\beta_1 \times t_1^2)/2$ (at a step Q11). This alarming section $L_2$ corresponds to a distance through which the vehicle travels within the first set time, when the speed-reduction from the vehicle speed $V_0$ is conducted with the first set deceleration $\beta_1$.

A speed-reducing section $L_3$ is calculated on the basis of the current vehicle speed $V_0$, the second set deceleration $\beta_2$ and the second set time $t_2$ according to an expression, $L_3 = V_0 t_2 - (\beta_2 \times t_2^2)/2$ (at a step Q12). This speed-reducing section $L_3$ corresponds to a distance through which the vehicle travels within the second set time $t_2$, when the speed-reduction from the vehicle speed $V_0$ is conducted with the second set deceleration $\beta_2$.

Then, in the judgment-execution determining means 19, coordinates $P_0$, $N_1$ to Nn of node points included in the investigating section $L_1$ are extracted, and a turn of a corner, an intersection, a crank, a junction or the like within the investigating section $L_1$ is detected (at steps Q13 and Q14).

If the intersection, the crank or the junction is not detected at the step Q15 and the corner is not detected at the step Q16, or if the right-turning or left-turning is not conducted at such intersection or the like at the step Q17 and the corner is not detected at the step Q16 even if the intersection, the crank and/or the junction are/is detected at the step Q15, i.e., if the road within the investigating section $L_1$ in which the vehicle travels is a straight road, it is decided that the vehicle is passable through the investigating section $L_1$ without giving an alarm and without conducting the speed-reduction, and the system operation returns to the start of a program.

Figure 13:
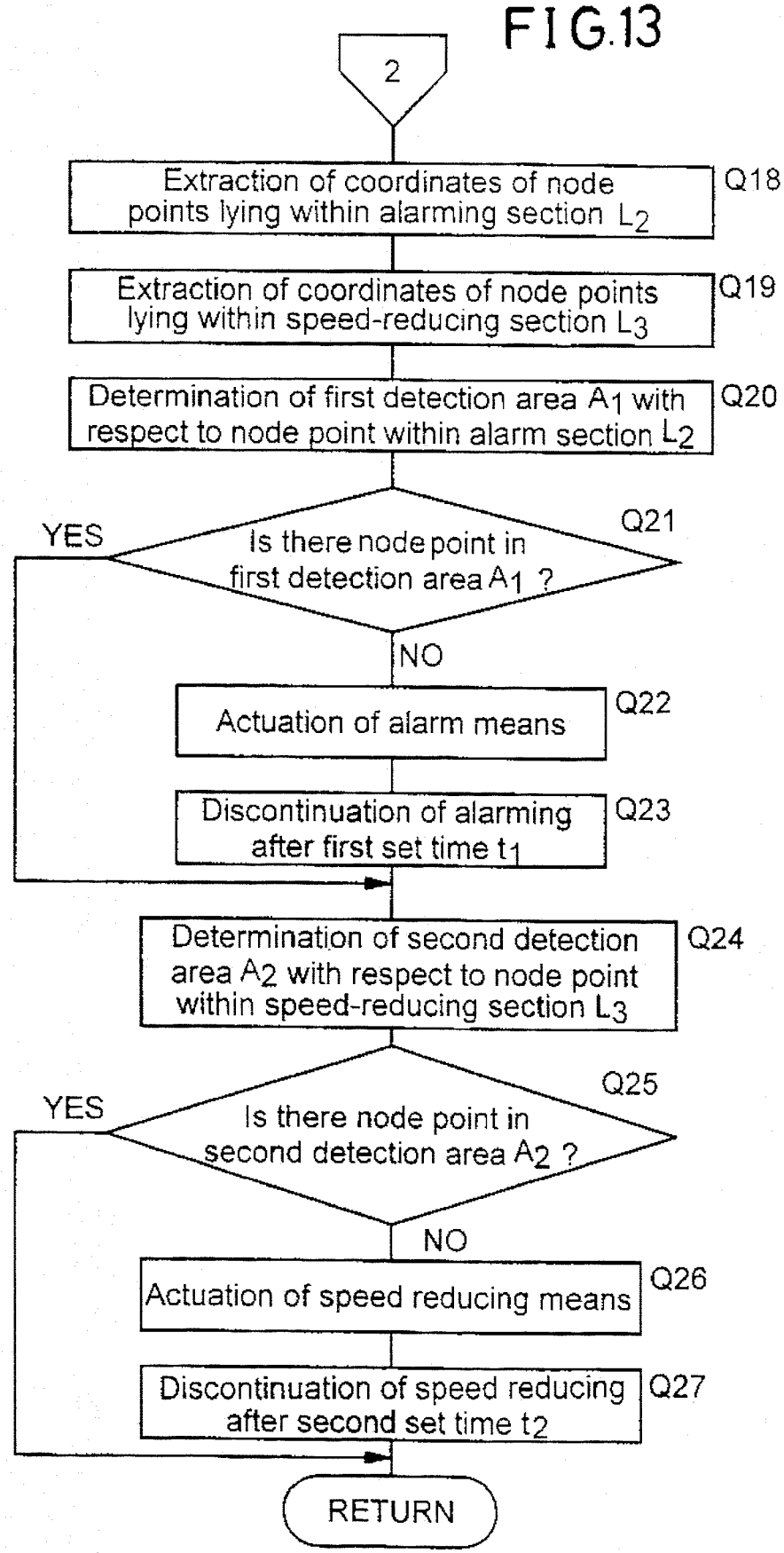

If the intersection, the crank and/or the junction is detected at the step Q15 and the right-turning or the left-turning is conducted at such intersection or the like at the step Q17, or if the corner is detected at the step Q16, i.e., if the road within the investigating section $L_1$ in which the vehicle travels is not a straight road, it is decided that it can be required to give an alarm and conduct the speed-reduction, moving to a step Q18 in the flow chart portion shown in FIG. 13.

Moving to the flow chart portion shown in FIG. 13, in the alarming-execution determining means 20, coordinates Nj+1 to Nk of node points within the alarming section $L_2$ are extracted, and coordinates $P_0$, $N_1$ to N-j of node points within the speed-reducing section $L_3$ are extracted (at steps Q18 and Q19). Then, a first detection area $A_1$ is established for each node point within the alarming section $L_2$.

Figure 14:
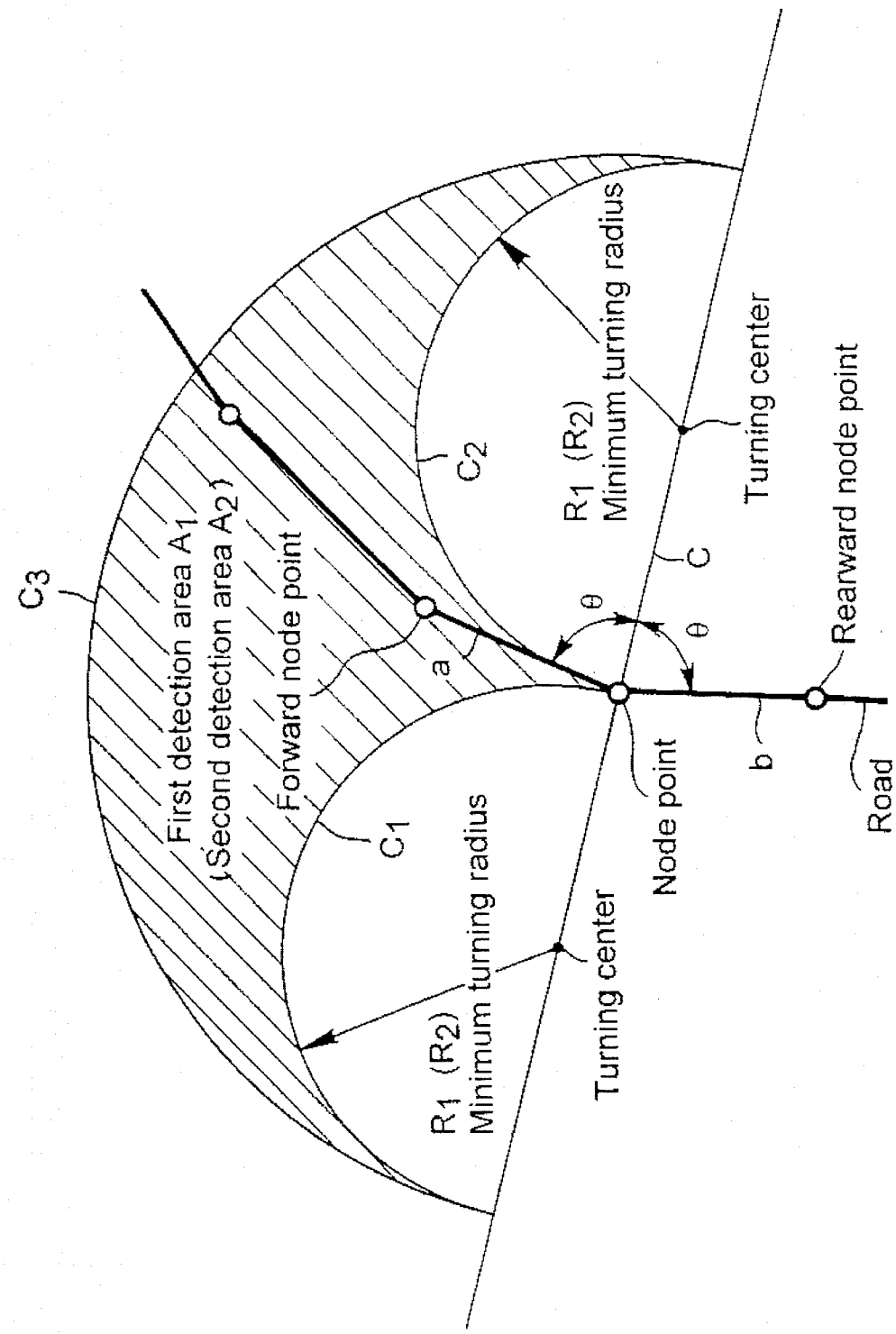

FIG. 14 illustrates a method for determining the first detection area $A_1$. According to this method, first, a line c bisecting an angle formed by two lines: a line segment a connecting the node point within the alarming section $L_2$ and a forward node point and a line segment b connecting the node point and a rearward node point is described. A minimum turning radius $R_1$ is calculated on the basis of the current vehicle speed $V_0$ and the first set lateral acceleration $\alpha_1$ according to an expression, $R_1 V_0^2/\alpha_1$. And two circular arcs $C_1$ and $C_2$ having a turning center on the bisecting line c and passing the node point are described. Then, an obliquely-lined area surrounded by a circular arc $C_3$ of a radius $2R_1$ about the node point and by the two circular arcs $C_1$ and $C_2$ is determined as the first detection area $A_1$.

Figure 15:
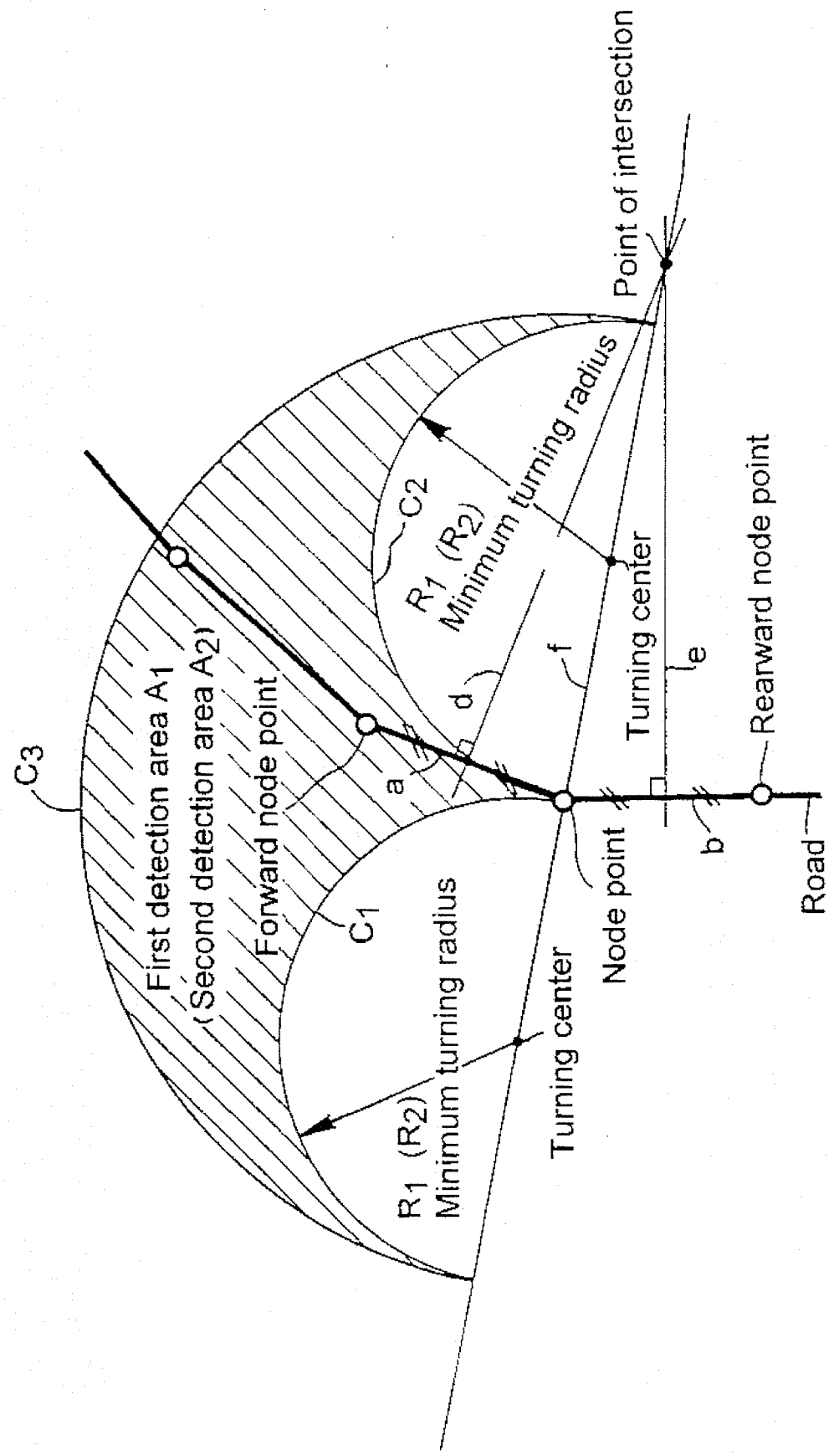

FIG. 15 illustrates another method for determining the first detection area $A_1$. According to this method, a point of intersection between a line d for vertically bisecting a line segment a connecting the node point within the alarming section $L_2$ and a forward node point and a line segment e bisecting a line segment b connecting the node point and a rearward node point is first determined. And a straight line f connecting such point of intersection and the node point is described. A minimum turning radius $R_1$ is calculated on the basis of the current vehicle speed $V_0$ and the first set lateral acceleration $a_1$ according to an expression, $R_1 = V_0^2/\alpha_1$. And two circular arcs $C_1$ and $C_2$ having a turning center on the straight line f and passing the node point are described. Then, an obliquely lined area surrounded by a circular arc $C_3$ of a radius $2R_1$ about the node point and by the two circular arcs $C_1$ and $C_2$ is determined as the first detection area $A_1$.

The minimum turning radius $R_1$ of the first detection area $A_1$ determined in the above manner corresponds to a minimum turning radius at which the vehicle can be turned at a lateral acceleration equal to or less than the first set lateral acceleration $\alpha_1$, when the vehicle enters the node point at the current vehicle speed $V_0$. Therefore, if the forward node point is inside the first detection area $A_1$, the vehicle is passable through the node point at a lateral acceleration equal to or less than the first set lateral acceleration $\alpha_1$. On the other hand, if the forward node point is outside the first detection area $A_1$, the vehicle is impassable through the node point at a lateral acceleration equal to or less than the first set lateral acceleration $\alpha_1$.

If the forward node point is outside the first detection area $A_1$ (at step Q21), it is decided that the vehicle is impassable through the alarming section $L_2$ at the current vehicle speed $V_0$, and the alarm means $12_2$ is actuated to alarm the driver to conduct the speed-reduction, and this alarming is stopped after a lapse of the first set time $t_1$ (at steps Q22 and Q23). The alarm means $12_2$ will be described in detail hereinafter.

Then, in the speed-reducing execution determining means 21, a second detection area $A_2$ is established for each node point within the speed-reducing section $L_3$ (at a step Q24). The establishment of this second detection area $A_2$ is carried out in substantially the same manner as the establishment of the first detection area $A_1$ which has been described above in connection with FIGS. 14 and 15. But there is a difference in only a respect that a minimum turning radius $R_2$ is calculated on the basis of the second set lateral acceleration $\alpha_2$ ($\alpha_2 > \alpha_1$) according to an expression, $R_2 = V_0^2/\alpha_2$. Thus, the minimum turning radius $R_2$ of the second detection area $A_2$ is smaller than the minimum turning radius $R_1$ of the first detection area $A_1$ ($R_2 < R_1$).

The minimum turning radius $R_2$ of the second detection area $A_2$ established in the above manner corresponds to a minimum turning radius at which the vehicle can be turned at a lateral acceleration equal to or less than the second set lateral acceleration $\alpha_2$, when the vehicle enters the node point at the current vehicle speed $V_0$. If the forward node point is inside the second detection area $A_2$, the vehicle is passable through the node point at a lateral acceleration equal to or less than the second set lateral acceleration $\alpha_2$. On the other hand, if the forward node point is outside the second detection area $A_2$, the vehicle is impassable through the node point at a lateral acceleration equal to or less than the second set lateral acceleration $\alpha_2$.

If the forward node point is outside the second detection area $A_2$ (at a step Q25), it is decided that the vehicle is impassable through the speed-reducing area $L_3$ at the current vehicle speed $V_0$, and the speed-reducing means $13_2$ is actuated to automatically conduct the speed-reduction which is stopped after a lapse of the second set time $t_2$ (steps Q26 and Q27).

As described above, it is first judged whether or not there is a corner or the like in the investigating section $L_1$, and if there is no corner and the like, the judgment whether or not the vehicle is passable through the alarming section $L_2$ and the speed-reducing section $L_3$ is discontinued. Therefore, if the vehicle travels on a road having a long continued straight portion without any hindrance to the vehicle's passage thereover, such as a freeway, an unnecessary calculation can be prevented from being conducted. Accordingly, the invention provides a reduction in size of a calculating means used therein and also increases the speed of other calculations made thereby. Moreover, by conducting the alarming and the speed-reduction functions on the basis of the decision that the vehicle is passable or impassable through the alarming section $L_2$ and the speed-reducing section $L_3$, a fine control of the vehicle speed can be performed from the alarming to the speed-reduction in accordance with the approaching condition of the vehicle to a corner or the like.

The time of operation of the alarm means $12_2$ and the time of operation of the speed-reducing means $13_2$ have been defined by the first and second set times $t_1$ and $t_2$ previously set in the above embodiment, but they can be determined in other manners such as the following:

If it is decided that the vehicle is impassable through a predetermined node point within the alarming section $L_2$ at a current vehicle speed $V_0$, a first target vehicle speed $V_1$ as a vehicle speed permitting the vehicle to pass through such node point is calculated and stored in a memory.

Figure 16:
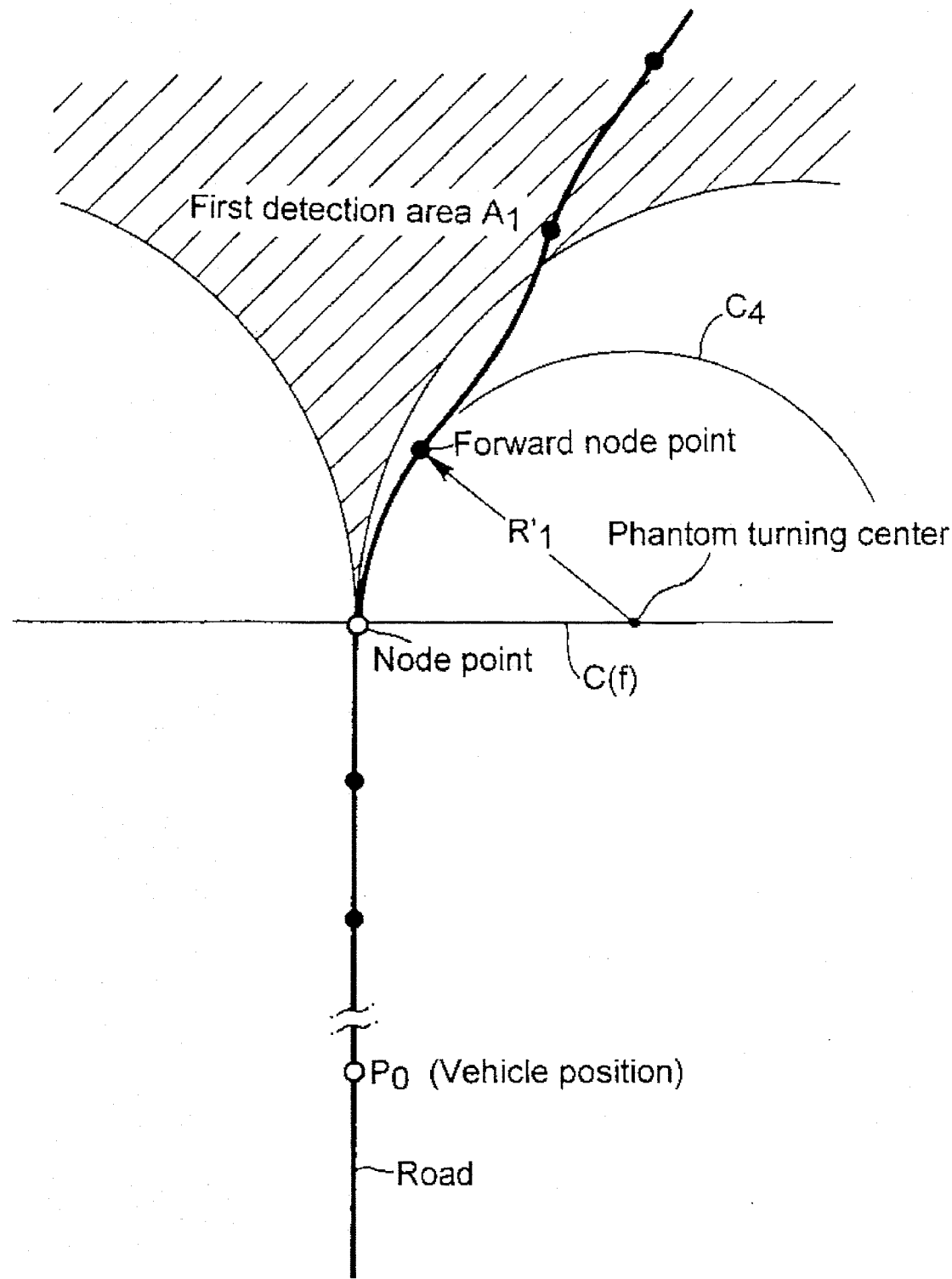

FIG. 16 illustrates a method for determining the first target vehicle speed $V_1$. If a forward node point is outside a first detection area $A_1$ established at a node point, a circular arc $C_4$ extending through the node point and the forward node point and having a phantom turning center on the straight line c (see FIG. 14) or a straight line f (see FIG. 15) is described, and a first target vehicle speed $V_1$ is calculated on the basis of a radius $R_1'$ of of this circular arc $C_4$ and the first set lateral acceleration $\alpha_1$ according to an expression, $V_1 = (\alpha_1 \times R_1')^{1/2}$.

If a driver operates the brake in response to an alarm, thereby causing the vehicle speed $V_0$ to be reduced to the first target vehicle speed $V_1$ stored in the memory, the operation of the alarm means $12_2$ is discontinued. This memory value is eliminated when the vehicle speed $V_0$ has reached the first target vehicle speed $V_1$, or when the vehicle has reached the node point.

Likewise, if it is decided that the vehicle is impassable through a predetermined node point within the speed-reducing section $L_3$ at a current vehicle speed $V_0$, a second target vehicle speed $V_2$ as a vehicle speed permitting the vehicle to pass through such node point is calculated in the same manner as that shown in FIG. 8. In this case, the second target vehicle speed $V_2$ is calculated on the basis of the second set lateral acceleration $\alpha_2$ according to an expression, $V_2 = (\alpha_2 \times R_2')^{1/2}$.

If the vehicle speed $V_0$ is reduced to the second target vehicle speed $V_2$ stored in the memory by an automatic reduction of speed, the operation of the speed-reducing means $13_2$ is discontinued. This memory value is eliminated when the vehicle speed $V_0$ has reached the second target vehicle speed $V_2$, or when the vehicle has reached the node point.

Further, the judgment of whether or not the alarming means $12_2$ and the speed-reducing; means $13_2$ should be actuated can be carried out in the following manner:

A first target vehicle speed $V_1$ is calculated in the manner described above for all the node points within the alarming section $L_2$, and is stored in the memory. Then, a deceleration required to reduce the current vehicle speed $V_0$ to the first target vehicle speed $V_1$ before the vehicle reaches each node point is calculated. When such deceleration exceeds the first set deceleration $\beta_1$, the alarm means $12_2$ is actuated. Likewise, the second target vehicle speed $V_2$ is calculated for all the node points within the speed-reducing section $L_3$, and is stored in the memory. When a deceleration required to reduce the current vehicle speed $V_0$ to the second target vehicle speed $V_2$ before the vehicle reaches each node point, exceeds the second set deceleration $\beta_2$, the speed-reducing means is actuated.

The specified construction of the alarm means $12_2$ will be described below.

Figure 17:
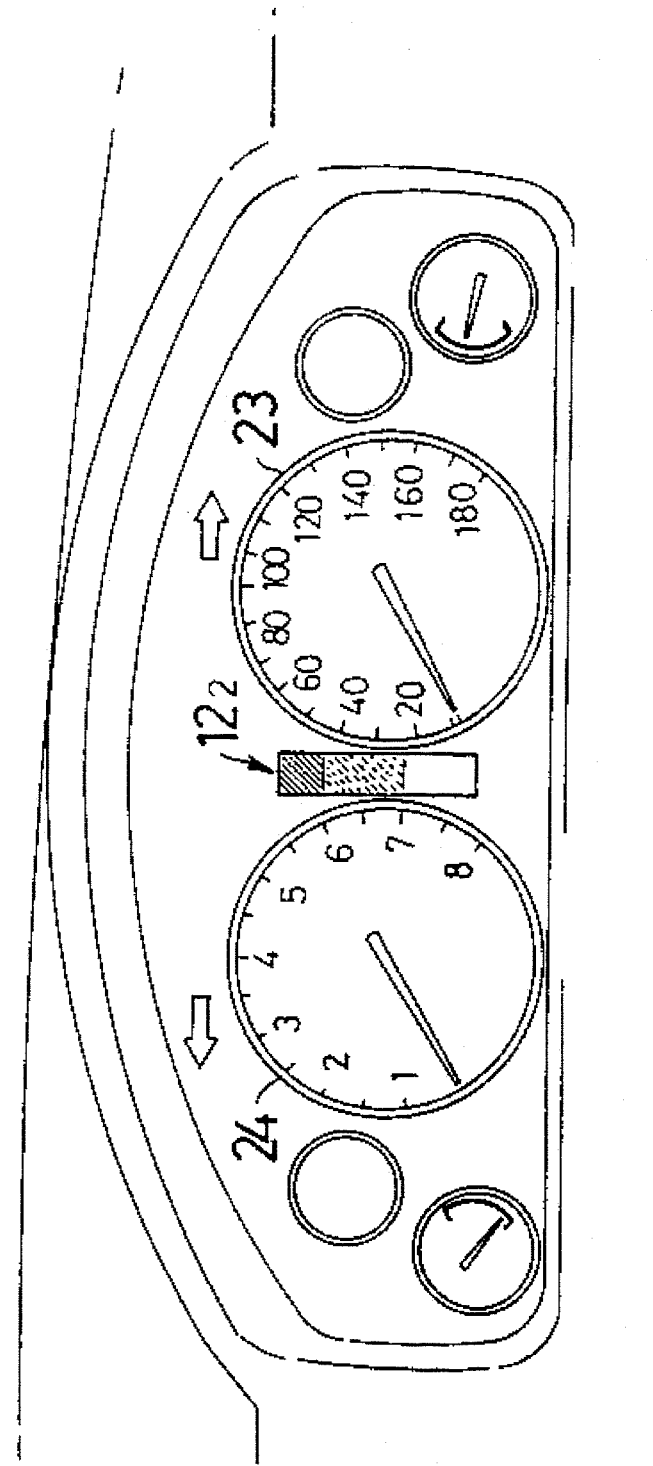

As shown in FIG. 17, the alarm means $12_2$ including a light-emitting diode is formed into a lengthwise long bar and mounted at an easily visible place between a speedometer 23 and a tachometer 24 mounted in an instrument panel.

Figure 18:
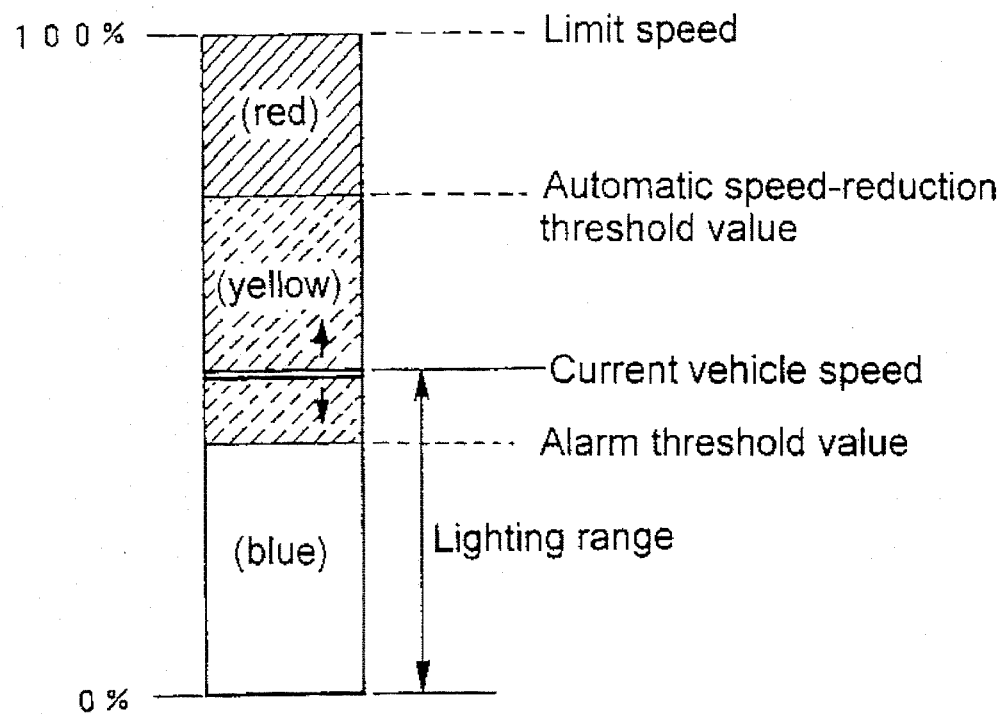

As shown in FIG. 18, the alarm means 12₂ includes a "blue" region, a "yellow" region and a "red" region provided in sequence from the bottom to the top. The boundary between the "blue" region and the "yellow" region corresponds to an alarm threshold value at which the alarm means 12₂ is operated, and the boundary between the "yellow" region and the "red" region corresponds to an automatic speed-reduction threshold value at which the speed-reducing means 13₂ is operated. Each of the alarm threshold value and the automatic speed-reduction threshold value is determined as a fixed value which is not dependent on the curvature of a corner in this embodiment, but they can be varied depending upon, for example, a road surface condition and a driver's skill.

A region of the alarm means 12₂ from a lower end to a current vehicle speed is lit by an increase in vehicle speed, and when the vehicle speed exceeds the alarm threshold value, a portion of the "yellow" region between the alarm threshold value and the current value is lit, so that the degree of excess of the current vehicle speed can be easily recognized in accordance with the area of the lit portion. If the vehicle speed is further excessive to exceed the automatic speed-reduction threshold value, a portion of the "red" region between the automatic speed-reduction threshold value and the current vehicle speed is lit together with the entire "yellow" region, so that the degree of excess of the current vehicle speed can be easily recognized in accordance with the area of the lit portion.

Figure 19:
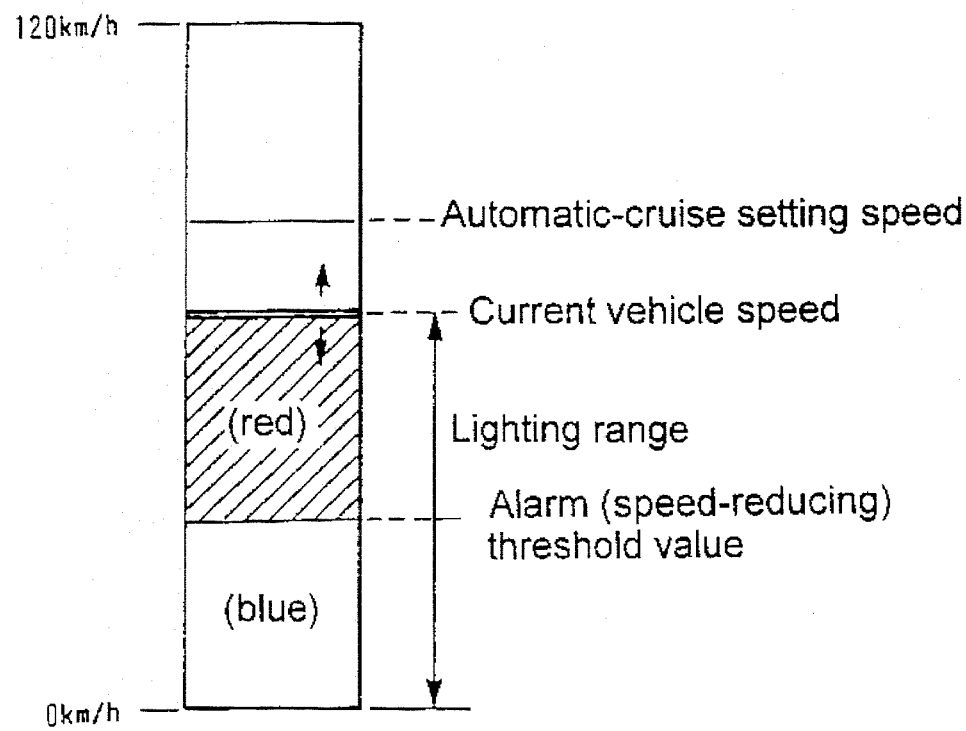

FIG. 19 illustrates another embodiment of an alarm means 12₂. In this alarm means 12₂, a region from its lower end to a current vehicle speed is lit by an increase in vehicle speed. In the lit region, a portion below an alarm (speed-reduction) threshold value is lit "blue", and a portion above the alarm (speed-reduction) threshold value is lit "red". The alarm (speed-reduction) threshold value is varied vertically depending on the curvature of a corner.

If the vehicle speed is equal to or less than the alarm (speed-reduction) threshold value, only a "blue" region is lit, and if the vehicle speed exceeds the alarm (speed-reduction) threshold value, the degree of excess of the current vehicle speed is easily recognized by the area of a "red" region lit in accordance with the excess.

Figure 20:
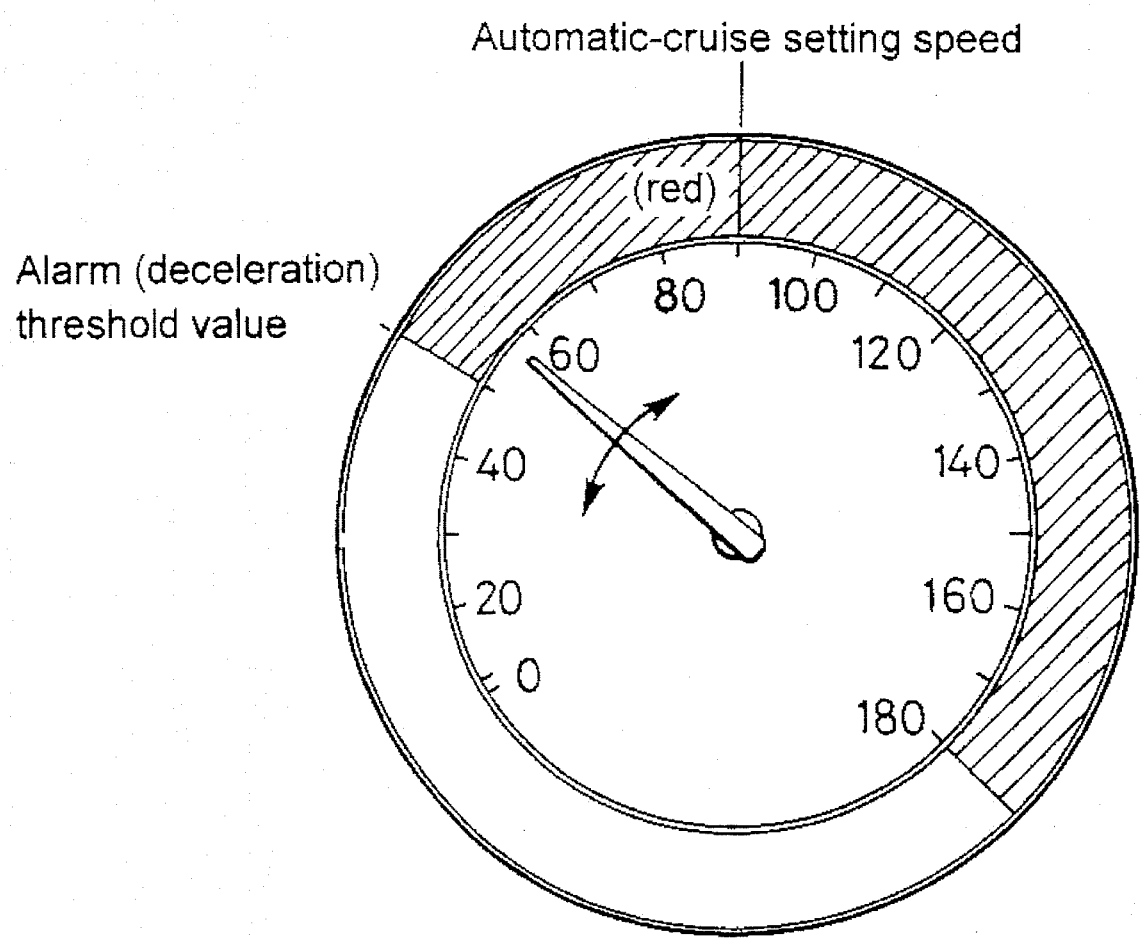

FIG. 20 illustrates a further embodiment of an alarm means 12₂. In this alarm means 12₂, an outer peripheral portion around a dial of a speedometer 23 is formed of a light-emitting diode. A portion indicating a higher speed than the alarm (speed-reduction) threshold value (a variable value dependent upon the curvature of a corner) is lit as a "red" region. Therefore, the excess amount of the vehicle speed can be visually recognized by a distance between the position of a pointer indicating a current speed and a starting end of the "red" region. If the starting end of the lit "red" region is moved toward a lower-speed side as the vehicle approaches an entrance of a corner, it is possible to permit the driver to further effectively recognize the emergence degree.

As described above, an alarm can be reliably given by giving a visual alarm by lighting of the light-emitting diode, even when an auditorily handicapped driver is driving the vehicle, or even when the sound volume of an audio device is too large to provide a sufficient effect by an alarm means such as a chime or a buzzer.

When it is required to give an alarm because the vehicle speed is excessive, it is possible to permit a driver to further reliably recognize an alarm not only by lighting the alarm means 12₂, but also by simultaneously lighting all indicators on the instrument panel such as the speedometer 23, the tachometer 24 and a lamp indicating the operation of a winker or blinker.

Although the embodiments of the present invention have been described in detail, it will be understood that the present invention is not limited to these embodiments, and various modifications can be made without departing from the spirit and scope of the invention defined in claims.

What is claimed is:

1. A driving control system for a vehicle, comprising:

a map information output means for outputting a map;

a vehicle position detecting means for detecting a vehicle position of a subject vehicle on the map;

a vehicle speed detecting means for detecting a vehicle speed;

a passable area determining means for determining a turning radius of the vehicle based on the detected vehicle speed and determining a passable area on the map which is safely passable by the vehicle based on the determined turning radius;

a passability/impassability judging means for deciding that the vehicle is safely passable within dimensions of an oncoming portion of road which is in front of the vehicle position in a traveling direction when the road portion is included in the passable area of the map; and said map information output means, said vehicle position detecting means, said vehicle speed detecting means, said passable area determining means, and said passability/impassability judging means being operatively interconnected.

2. A driving control system for a vehicle according to claim 1, wherein said passable area determining means calculates as said turning radius a minimum turnable radius that said vehicle can follow at said detected vehicle speed.

3. A driving control system for a vehicle according to claim 2, wherein said passable area determining means calculates said minimum turnable radius with an increased value as the vehicle speed is increased.

4. A driving control system for a vehicle according to claim 2, wherein said passable area determining means defines two circular arcs having said minimum turnable radius so as to contact with each other at the vehicle position on the map, and determines the passable area outside said two circular arcs.

5. A driving control system for a vehicle according to claim 3, wherein said passable area determining means defines two circular arcs having said minimum turnable radius so as to contact with each other at the vehicle position on the map, and determines the passable area outside said two circular arcs.

6. A driving control system for a vehicle according to claim 1, wherein said passable area further based determining means determines said passable area on at least one of an operational condition of the vehicle and a driving environment of the vehicle.

7. A driving control system for a vehicle according to claim 1, further including a temporary vehicle position calculating means operatively connected to said map information output means, said vehicle position detecting means and said vehicle speed detecting means, for calculating a temporary vehicle position at a forward distance from an actual vehicle position on the basis of the detected vehicle speed, said passable area being determined based on said temporary vehicle position.

8. A driving control system for a vehicle according to claim 7, wherein said temporary vehicle position calculating means calculates the temporary vehicle position at a forward distance, which is set longer as the vehicle speed is larger.

9. A driving control system for a vehicle according to claim 1, wherein said passability/impassability judging means grasps said road as a set of position data of the road, and judges whether or not the vehicle is safely passable through the portion of road by whether or not said position data are included in data indicating said passable area.

10. A driving control system for a vehicle according to claim 1, further including a maximum turning radius determining means operatively connected to said map information output means, said vehicle position detecting means and said vehicle speed detecting means, for determining, based on a portion of road which is in front of the vehicle position in a traveling direction, a maximum vehicle-turning radius required for the vehicle to safely pass through said portion of road, when it is decided in the passability/impassability judging means that the road in front of the vehicle position is not included in said passable area and that the vehicle is impassable through said portion of road, and a passable vehicle speed calculating means operatively connected to said maximum turning radius determining means for calculating a passable vehicle speed on the basis of the maximum turning radius.

11. A driving control system according to claim 7, wherein said temporary vehicle position is intermediate said actual vehicle position and said passable area.

12. A driving control system for a vehicle according to claim 1, wherein said passable area determining means determines a total passable area on the map.

13. A driving control system for a vehicle, comprising:
   a map information output means for outputting a map;
   a vehicle position detecting means for detecting a vehicle position of a subject vehicle on the map;
   a vehicle speed detecting means for detecting a vehicle speed;
   a turning radius determining means for determining a turning radius of the vehicle based on said detected vehicle speed;
   a maximum turning radius determining means for determining, on the basis of a portion of road which is in front of the vehicle position in a traveling direction on the map, a maximum vehicle-turning radius required for the vehicle to safely pass through said road portion;
   a passable vehicle speed calculating means for calculating a passable vehicle speed at which the vehicle is safely passable within dimensions of said road portion based on the determined maximum turning radius and the determined turning radius; and
   said map information output means, said vehicle position detecting means, said vehicle speed detecting means, said turning radius determining means, said maximum turning radius determining means, and said passable vehicle speed calculating means being operatively interconnected.

14. A driving control system for a vehicle according to claim 13, wherein said map information output means determines a plurality of node points on said portion of road, and said maximum turning radius determining means sets a vehicle-turning radius required for the vehicle to pass through all the node points to the maximum turning radius.

15. A driving control system for a vehicle according to claim 13, further including a comparing means for comparing the detected vehicle speed with said calculated passable vehicle speed; and means for providing at least one of an alarm and a vehicle speed adjustment when the vehicle speed exceeds said passable vehicle speed; and said vehicle speed detecting means, said comparing means and said providing means being operatively interconnected with each other and with said map information output means, said vehicle position detecting means, said maximum turning radius determining means, and said passable vehicle speed calculating means.

16. A driving control system for a vehicle according to claim 14, further including a comparing means for comparing the detected vehicle speed with said calculated passable vehicle speed; and means for providing at least one of an alarm and a vehicle speed adjustment when the vehicle speed exceeds said passable vehicle speed; and said vehicle speed detecting means, said comparing means, and said providing means being operatively interconnected with each other and with said map information output means, said vehicle position detecting means, said maximum turning radius determining means, and said passable vehicle speed calculating means.

17. A driving control system for a vehicle according to claim 13, wherein said turning radius determining means determines as said turning radius a minimum turning radius that said vehicle can follow at said detected vehicle speed.

18. A driving control system for a vehicle, comprising:
   a map information output means for outputting a map;
   a vehicle position detecting means for detecting a vehicle position of a subject vehicle on the map;
   a vehicle speed detecting means for detecting a vehicle speed;
   a turning radius determining means for determining a turning radius of the vehicle based on said detected vehicle speed:
   a judging-section determining means for establishing a first section having a predetermined range and a second section having a range narrower than said predetermined range on a road in front of the vehicle position in a traveling direction;
   a judgment-execution determining means for judging whether or not the vehicle is safely passable through a road in the first section on the basis of the detected vehicle speed and a curved condition of the road on the map, and for determining, based on said judgment, whether or not a judgment of a passability or impassability of the vehicle through a road in the second section should be conducted;
   a passability/impassability judging means for judging whether or not the vehicle is safely passable within dimensions of the road in the second section based on the detected vehicle speed, the determined turning radius and the curved condition of the road on the map, when it is decided by the judgment-execution determining means that the judgment of the passability or impassability of the vehicle through the road in the second section should be conducted;
   means for providing at least one of an alarm and a vehicle speed adjustment based on said judgment of whether or not the vehicle is passable through the road in the second section; and
   said information output means, said vehicle position detecting means, said vehicle speed detecting means, said turning radius determining means, said judging-section determining means, said judgment-execution determining means, said passability/impassability judging means, and said providing means being operatively interconnected.

19. A driving control system for a vehicle according to claim 18, wherein said second section includes an alarming section and a speed-reducing section having a range narrower than said alarming section, and said passability/impassability judging means includes an alarming-execution determining means for determining that an alarm should be actuated on the basis of the judgment of whether or not the vehicle may pass through a road in said alarming section, and a vehicle speed adjusting execution determining means for determining that an adjustment of the vehicle speed should be conducted on the basis of whether or not the vehicle may pass through a road in said speed-reducing section.

20. A driving control system for a vehicle according to claim 18, wherein said turning radius determining means determines as said turning radius a minimum turning radius that said vehicle can follow at said detected vehicle speed.

* * * * *

UNITED STATES PATENT AND TRADEMARK OFFICE
CERTIFICATE OF CORRECTION

PATENT NO. : 5,539,397
DATED : July 23, 1996
INVENTOR(S) : Nobuyoshi Asanuma; Hiroshi Sekine; Yoshikazu Tsuchiya; Kazuya Tamura; Hiroyuki kamiya It is certified that error appears in the above-indentified patent and that said Letters Patent is hereby corrected as shown below:

Column 3, line 36, change"FIG" to --FIGS--.

Column 7, line 36, delete the semi-colon.

Column 10, line 41, insert an equals sign after the 1 and before the V.

Signed and Sealed this

Twenty-sixth Day of November 1996

Attest:

BRUCE LEHMAN

*Attesting Officer*   *Commissioner of Patents and Trademarks*